US012755321B2

(12) United States Patent
Marlow et al.

(10) Patent No.: US 12,755,321 B2
(45) Date of Patent: Oct. 6, 2026

(54) MACHINE LEARNING BASED ACCIDENT ASSESSMENT

(71) Applicant: Allstate Insurance Company, Northbrook, IL (US)

(72) Inventors: Clint J. Marlow, Barrington Hills, IL (US); John P. Kelsh, Antioch, IL (US)

(73) Assignee: Allstate Insurance Company, Northbrook, IL (US)

(*) Notice: Subject to any disclaimer, the term of this patent is extended or adjusted under 35 U.S.C. 154(b) by 0 days.

(21) Appl. No.: 18/366,559

(22) Filed: Aug. 7, 2023

(65) Prior Publication Data

US 2023/0385950 A1 Nov. 30, 2023

Related U.S. Application Data

(63) Continuation of application No. 17/166,335, filed on Feb. 3, 2021, now Pat. No. 11,720,971, which is a (Continued)

(51) Int. Cl.
*G06Q 40/08* (2012.01)

(52) U.S. Cl.
CPC ....... *G06Q 40/08* (2013.01); *G06Q 40/08222* (2025.08)

(58) Field of Classification Search
None
See application file for complete search history.

(56) References Cited

U.S. PATENT DOCUMENTS

| | | | |
|---|---|---|---|
| 4,638,289 A | 1/1987 | Zottnik | |
| 5,450,329 A | 9/1995 | Tanner | |

(Continued)

FOREIGN PATENT DOCUMENTS

| | | |
|---|---|---|
| AU | 2002301438 B2 | 9/2006 |
| AU | 2007200869 A1 | 3/2007 |

(Continued)

OTHER PUBLICATIONS

"Frost & Sullivan: Using Mobile Solutions to Improve Insurance Sector Performance," PR Newswire, retrieved from https://www.prnewswire.com/news-releases/frost--sullivan-using-mobile-solutions-to-improve-insurance-sector-performance-134029338.html, 3 pages (2011).

(Continued)

*Primary Examiner* — Paul S Schwarzenberg

(57) ABSTRACT

Aspects of the disclosure relate to using machine learning algorithms to analyze vehicle operational data associated with a vehicle accident. In some instances, an accident assessment server may receive data indicating that a vehicle was involved in an accident. The accident assessment server may compare the data with other known data, based on machine learning algorithms, to identify whether the accident resulted in a total loss. Responsive to determining that the accident resulted in the total loss, the accident assessment server may request further information regarding the vehicle and may identify a baseline value range for the vehicle. The accident assessment server may request updated information from the owner of the vehicle, identify, based on the updated information, a final value of the vehicle, and may pay the owner of the vehicle an amount corresponding to the final value if the final value is within the baseline value range.

20 Claims, 10 Drawing Sheets

Related U.S. Application Data continuation of application No. 15/493,685, filed on Apr. 21, 2017, now Pat. No. 10,937,103.

(56) References Cited

U.S. PATENT DOCUMENTS 5,742,699 A 4/1998 Adkins et al.
5,950,169 A 9/1999 Borghesi et al.
6,027,415 A 2/2000 Takeda
6,060,989 A 5/2000 Gehlot
6,061,610 A 5/2000 Boer
6,076,028 A 6/2000 Donnelly et al.
6,141,611 A 10/2000 Mackey et al.
6,211,777 B1 4/2001 Greenwood et al.
6,246,933 B1 6/2001 Bague
6,262,657 B1 7/2001 Okuda et al.
6,295,492 B1 9/2001 Lang et al.
6,330,499 B1 12/2001 Chou et al.
6,472,982 B2 10/2002 Eida et al.
6,509,868 B2 1/2003 Flick
6,594,579 B1 7/2003 Lowrey et al.
6,611,740 B2 8/2003 Lowrey et al.
6,641,038 B2 11/2003 Gehlot et al.
6,701,234 B1 3/2004 Vogelsang
6,732,020 B2 5/2004 Yamagishi
6,732,031 B1 5/2004 Lightner et al.
6,741,168 B2 5/2004 Webb et al.
6,762,020 B1 7/2004 Mack et al.
6,765,499 B2 7/2004 Flick
6,798,356 B2 9/2004 Flick
6,909,947 B2 6/2005 Douros et al.
6,925,425 B2 8/2005 Remboski et al.
6,946,966 B2 9/2005 Koenig
6,980,313 B2 12/2005 Sharif et al.
6,982,654 B2 1/2006 Rau et al.
6,988,033 B1 1/2006 Lowrey et al.
7,069,118 B2 6/2006 Coletrane et al.
7,082,359 B2 7/2006 Breed
7,092,803 B2 8/2006 Kapolka et al.
7,113,127 B1 9/2006 Banet et al.
7,119,669 B2 10/2006 Lundsgaard et al.
7,129,826 B2 10/2006 Nitz et al.
7,133,611 B2 11/2006 Kaneko
7,143,290 B1 11/2006 Ginter et al.
7,155,259 B2 12/2006 Bauchot et al.
7,155,321 B2 12/2006 Bromley et al.
7,174,243 B1 2/2007 Lightner et al.
7,271,716 B2 9/2007 Nou
7,305,293 B2 12/2007 Flick
7,348,895 B2 3/2008 Lagassey
7,477,968 B1 1/2009 Lowrey et al.
7,565,230 B2 7/2009 Gardner et al.
7,671,727 B2 3/2010 Flick
7,702,529 B2 4/2010 Wahlbin et al.
7,715,961 B1 5/2010 Kargupta
7,747,365 B1 6/2010 Lowrey et al.
7,792,690 B2 9/2010 Wahlbin et al.
7,809,586 B2 10/2010 Wahlbin et al.
7,885,829 B2 2/2011 Danico et al.
7,890,355 B2 2/2011 Gay et al.
7,970,834 B2 6/2011 Daniels et al.
8,000,979 B2 8/2011 Blom
8,014,789 B2 9/2011 Breed
8,019,629 B1 9/2011 Medina et al.
8,041,635 B1 10/2011 Garcia et al.
8,069,060 B2 11/2011 Tipirneni
8,090,598 B2 1/2012 Bauer et al.
8,140,358 B1 3/2012 Ling et al.
8,214,100 B2 7/2012 Lowrey et al.
8,229,759 B2 7/2012 Zhu et al.
8,239,220 B2 8/2012 Kidd et al.
8,255,243 B2 8/2012 Raines et al.
8,255,275 B2 8/2012 Collopy et al.
8,260,639 B1 9/2012 Medina et al.
8,271,187 B2 9/2012 Taylor et al.
8,285,588 B2 10/2012 Postrel
8,311,858 B2 11/2012 Everett et al.
8,321,086 B2 11/2012 Park et al.
8,330,593 B2 12/2012 Golenski
8,364,505 B1 1/2013 Kane et al.
8,370,254 B1 2/2013 Hopkins et al.
8,392,280 B1 3/2013 Kilshaw
8,401,877 B2 3/2013 Salvagio
8,403,225 B2 3/2013 Sharra et al.
8,417,604 B2 4/2013 Orr et al.
8,423,239 B2 4/2013 Blumer et al.
8,432,262 B2 4/2013 Talty et al.
8,433,590 B2 4/2013 Prescott
8,438,049 B2 5/2013 Ranicar et al.
8,442,508 B2 5/2013 Harter et al.
8,447,459 B2 5/2013 Lowrey et al.
8,452,486 B2 5/2013 Banet et al.
8,463,488 B1 6/2013 Hart
8,466,781 B2 6/2013 Miller et al.
8,478,514 B2 7/2013 Kargupta
8,484,113 B2 7/2013 Collopy et al.
8,494,938 B1 7/2013 Kazenas
8,510,133 B2 8/2013 Peak et al.
8,510,200 B2 8/2013 Pearlman et al.
8,527,135 B2 9/2013 Lowrey et al.
8,547,435 B2 10/2013 Mimar
8,554,584 B2 10/2013 Hargroder
8,571,895 B1 10/2013 Medina et al.
8,577,703 B2 11/2013 Mcclellan et al.
8,595,034 B2 11/2013 Bauer et al.
8,598,977 B2 12/2013 Maalouf et al.
8,620,692 B2 12/2013 Collopy et al.
8,630,768 B2 1/2014 Mcclellan et al.
8,633,985 B2 1/2014 Haynes et al.
8,635,091 B2 1/2014 Amigo et al.
8,645,014 B1 2/2014 Kozlowski et al.
8,712,893 B1 4/2014 Brandmaier et al.
8,788,297 B2 7/2014 Thomas et al.
8,788,301 B1 7/2014 Marlow et al.
8,788,406 B2 7/2014 Roll et al.
8,799,034 B1 8/2014 Brandmaier et al.
8,903,852 B1 12/2014 Pedregal et al.
8,935,036 B1 1/2015 Christensen et al.
9,311,677 B2 4/2016 Thomas et al.
9,325,807 B1 4/2016 Meoli et al.
10,032,226 B1 7/2018 Suizzo et al.
10,102,587 B1 * 10/2018 Potter .................... B60R 25/04
2002/0055861 A1 5/2002 King et al.
2002/0063637 A1 5/2002 Eida et al.
2002/0111725 A1 8/2002 Burge
2002/0135679 A1 9/2002 Scaman
2003/0154111 A1 8/2003 Dutra et al.
2003/0212567 A1 11/2003 Shintani et al.
2003/0233261 A1 12/2003 Kawahara et al.
2004/0083123 A1 4/2004 Wook-Bae
2004/0088090 A1 5/2004 Wee
2004/0186744 A1 9/2004 Lux
2004/0189493 A1 9/2004 Estus et al.
2004/0205622 A1 10/2004 Jones et al.
2005/0021374 A1 1/2005 Allahyari
2005/0161505 A1 7/2005 Yin et al.
2005/0216487 A1 9/2005 Fisher et al.
2005/0267774 A1 * 12/2005 Merritt ............... G06Q 10/0637
705/306
2005/0278082 A1 12/2005 Weekes
2006/0224305 A1 10/2006 Ansari et al.
2006/0226960 A1 10/2006 Pisz et al.
2007/0009136 A1 1/2007 Pawlenko et al.
2007/0043594 A1 2/2007 Lavergne
2007/0136162 A1 6/2007 Thibodeau et al.
2007/0162308 A1 7/2007 Peters
2007/0288268 A1 12/2007 Weeks
2008/0027761 A1 1/2008 Bracha
2008/0242261 A1 10/2008 Shimanuki et al.
2008/0294690 A1 11/2008 McClellan et al.
2009/0106052 A1 4/2009 Moldovan
2009/0156243 A1 6/2009 Lichtenfeld et al.
2009/0164504 A1 6/2009 Flake et al.
2009/0198772 A1 8/2009 Kim et al.
2009/0254241 A1 10/2009 Basir

(56) References Cited

U.S. PATENT DOCUMENTS

| | | | |
|---|---|---|---|
| 2009/0265193 | A1 | 10/2009 | Collins et al. |
| 2009/0265385 | A1 | 10/2009 | Beland et al. |
| 2010/0030540 | A1 | 2/2010 | Choi et al. |
| 2010/0030586 | A1 | 2/2010 | Taylor et al. |
| 2010/0131300 | A1 | 5/2010 | Collopy et al. |
| 2010/0138242 | A1 | 6/2010 | Ferrick et al. |
| 2010/0161491 | A1 | 6/2010 | Bauchot et al. |
| 2010/0174564 | A1 | 7/2010 | Stender et al. |
| 2011/0015946 | A1 | 1/2011 | Buckowsky et al. |
| 2011/0070834 | A1 | 3/2011 | Griffin et al. |
| 2011/0077028 | A1 | 3/2011 | Wilkes et al. |
| 2011/0112870 | A1 | 5/2011 | Berg et al. |
| 2011/0153369 | A1 | 6/2011 | Feldman et al. |
| 2011/0161116 | A1 | 6/2011 | Peak et al. |
| 2011/0161118 | A1 | 6/2011 | Borden et al. |
| 2011/0185178 | A1 | 7/2011 | Gotthardt |
| 2011/0213628 | A1 | 9/2011 | Peak et al. |
| 2011/0281564 | A1 | 11/2011 | Armitage et al. |
| 2011/0307188 | A1 | 12/2011 | Peng et al. |
| 2011/0313936 | A1 | 12/2011 | Sieger |
| 2012/0028680 | A1 | 2/2012 | Breed |
| 2012/0047203 | A1 | 2/2012 | Brown et al. |
| 2012/0072243 | A1 | 3/2012 | Collins et al. |
| 2012/0076437 | A1 | 3/2012 | King |
| 2012/0084179 | A1 | 4/2012 | Mcrae et al. |
| 2012/0109690 | A1 | 5/2012 | Weinrauch et al. |
| 2012/0109692 | A1 | 5/2012 | Collins et al. |
| 2012/0119936 | A1 | 5/2012 | Miller et al. |
| 2012/0136802 | A1 | 5/2012 | Mcquade et al. |
| 2012/0150412 | A1 | 6/2012 | Yoon et al. |
| 2012/0191476 | A1 | 7/2012 | Reid et al. |
| 2012/0197486 | A1 | 8/2012 | Elliott |
| 2012/0197669 | A1 | 8/2012 | Kote et al. |
| 2012/0209631 | A1 | 8/2012 | Roscoe et al. |
| 2012/0209632 | A1 | 8/2012 | Kaminski et al. |
| 2012/0230548 | A1 | 9/2012 | Calman et al. |
| 2012/0232995 | A1 | 9/2012 | Castro et al. |
| 2012/0239417 | A1 | 9/2012 | Pourfallah et al. |
| 2012/0242503 | A1 | 9/2012 | Thomas et al. |
| 2012/0250938 | A1 | 10/2012 | Dehart |
| 2012/0259665 | A1 | 10/2012 | Pandhi et al. |
| 2012/0290150 | A1 | 11/2012 | Doughty et al. |
| 2012/0303392 | A1 | 11/2012 | Depura et al. |
| 2012/0316893 | A1 | 12/2012 | Egawa |
| 2012/0330687 | A1 | 12/2012 | Hilario et al. |
| 2013/0006674 | A1 | 1/2013 | Bowne et al. |
| 2013/0006675 | A1 | 1/2013 | Bowne et al. |
| 2013/0018676 | A1 | 1/2013 | Fischer et al. |
| 2013/0030642 | A1 | 1/2013 | Bradley et al. |
| 2013/0033386 | A1 | 2/2013 | Zlojutro |
| 2013/0035964 | A1 | 2/2013 | Roscoe et al. |
| 2013/0046510 | A1 | 2/2013 | Bowne et al. |
| 2013/0054274 | A1 | 2/2013 | Katyal |
| 2013/0073318 | A1 | 3/2013 | Feldman et al. |
| 2013/0073321 | A1 | 3/2013 | Hofmann et al. |
| 2013/0138267 | A1 | 5/2013 | Hignite et al. |
| 2013/0151288 | A1 | 6/2013 | Bowne et al. |
| 2013/0166098 | A1 | 6/2013 | Lavie et al. |
| 2013/0166326 | A1 | 6/2013 | Lavie et al. |
| 2013/0179027 | A1 | 7/2013 | Mitchell |
| 2013/0179198 | A1 | 7/2013 | Bowne et al. |
| 2013/0190967 | A1 | 7/2013 | Hassib et al. |
| 2013/0197945 | A1 | 8/2013 | Anderson |
| 2013/0204645 | A1 | 8/2013 | Lehman et al. |
| 2013/0211660 | A1 | 8/2013 | Mitchell |
| 2013/0226397 | A1 | 8/2013 | Kuphal et al. |
| 2013/0289819 | A1 | 10/2013 | Hassib et al. |
| 2013/0290036 | A1 | 10/2013 | Strange |
| 2013/0297353 | A1 | 11/2013 | Strange et al. |
| 2013/0297418 | A1 | 11/2013 | Collopy et al. |
| 2013/0300552 | A1 | 11/2013 | Chang |
| 2013/0304517 | A1 | 11/2013 | Florence |
| 2013/0311209 | A1 | 11/2013 | Kaminski et al. |
| 2013/0316310 | A1 | 11/2013 | Musicant et al. |
| 2013/0317860 | A1 | 11/2013 | Schumann, Jr. |
| 2013/0339062 | A1 | 12/2013 | Brewer et al. |
| 2014/0025404 | A1 | 1/2014 | Jackson et al. |
| 2014/0039934 | A1 | 2/2014 | Rivera |
| 2014/0039935 | A1 | 2/2014 | Rivera |
| 2014/0058956 | A1* | 2/2014 | Raines ............... G06Q 30/0201 705/306 |
| 2014/0081673 | A1 | 3/2014 | Batchelor |
| 2014/0081675 | A1* | 3/2014 | Ives ....................... G06Q 40/08 705/4 |
| 2014/0081876 | A1 | 3/2014 | Schulz |
| 2014/0100889 | A1 | 4/2014 | Tofte |
| 2014/0111542 | A1 | 4/2014 | Wan |
| 2014/0197939 | A1 | 7/2014 | Stefan et al. |
| 2014/0200924 | A1 | 7/2014 | Gilbert et al. |
| 2014/0200929 | A1 | 7/2014 | Fitzgerald et al. |
| 2014/0244312 | A1 | 8/2014 | Gray et al. |
| 2015/0045983 | A1* | 2/2015 | Fraser .................... G07C 5/008 701/1 |
| 2015/0058045 | A1 | 2/2015 | Santora |
| 2015/0127570 | A1 | 5/2015 | Doughty et al. |
| 2015/0170287 | A1 | 6/2015 | Tirone et al. |
| 2015/0213556 | A1 | 7/2015 | Haller, Jr. |
| 2017/0293894 | A1* | 10/2017 | Taliwal ................. G06T 7/0004 |
| 2018/0108189 | A1* | 4/2018 | Park ....................... G07C 5/008 |

FOREIGN PATENT DOCUMENTS

| | | | |
|---|---|---|---|
| CA | 2658219 | A1 | 1/2008 |
| DE | 10 2010 001 006 | A1 | 7/2011 |
| EP | 1 826 734 | A1 | 8/2007 |
| EP | 1 965 361 | A2 | 9/2008 |
| EP | 2 481 037 | A1 | 8/2012 |
| GB | 2 486 384 | A | 6/2012 |
| GB | 2 488 956 | A | 9/2012 |
| KR | 20020067246 | A | 8/2002 |
| WO | WO-02/079934 | A2 | 10/2002 |
| WO | WO-2012/045128 | A1 | 4/2012 |
| WO | WO-2012/067640 | A1 | 5/2012 |
| WO | WO-2012/097441 | A1 | 7/2012 |
| WO | WO-2012/106878 | A1 | 8/2012 |
| WO | WO-2012/173655 | A1 | 12/2012 |
| WO | WO-2012/174590 | A1 | 12/2012 |
| WO | WO-2013/072867 | A1 | 5/2013 |

OTHER PUBLICATIONS

Angellist, "Genie Cam by Selka Inc.," retrieved from https://angel.co/company/geniecam, 6 pages (2012).

Arnold, et al., "Information-Sharing in Out-of-Hospital Disaster Response: The Future Role of Information Technology," Prehospital and Disaster Medicine 19(3), pp. 201-207 (2004).

Bachman & Preziotti, "Automated Collision Notification (ACN) Field Operational Test (FOT) Evaluation Report," National Highway Traffic Safety Administration, retrieved from http://www.nhtsa.gov/DOT/NHTSA/NRD/Multimedia/PDFs/Crash%20Avoidance/2001/ACNEvaluation.pdf, 84 pages (2001).

BoxyMo, "BoxyMo Telematics," retrieved from https://www.boxymo.ie/telematics. aspx, 3 pages (2014).

Boyle, "Scan Someone's License Plate and Message Them Instantly with New Bump App," Popular Science, retrieved from https://www.popsci.com/cars/article/2010-09/social-networking-site-uses-license-plates-connect-drivers/, 4 pages (2010).

Bush, "License plate readers allow police to quickly scan, check for offenders," The Topeka Capital-Journal, retrieved from https://www.cjonline.com/article/20130317/NEWS/303179882, 3 pages (2013).

Carney, "Trends 2013: North American Insurance eBusiness And Channel Strategy," Forrester, retrieved from https://www.forrester.com/report/trends-2013-north-american-insurance-ebusiness-and-channel-strategy/RES94742, 25 pages (2013).

Ceska Pojistovna, "Comprehensive motor vehicle insurance," T. No. 7506 Jan. 2014 MHA, 30 pages (2014).

Comcare Alliance, "Automatic Crash Notification," National Highway Traffic Safety Administration, retrieved from http://www.nhtsa.gov/DOT/NHTSA/NRD/Articles/EDR/PDF/Research/ComCARE_ACN_System.pdf, 2 pages (no date, accessed 2013).

(56) References Cited

OTHER PUBLICATIONS

Deloitte, "Insurance Tech Trends 2013: Elements of postdigital," retrieved from https://www2.deloitte.com/content/dam/Deloitte/cn/Documents/about-deloitte/aff2014/deloitte-cn-aff2014-insurancetechtrends2013-en-040114.pdf, 100 pages (2013).
Domanico, "Geico Releases Insurance Glovebox App for Android," retrieved from http://androidandme.com/2010/08/applications/geico-releases-insurance-glovebox-app-for-android/ (2010).
Donnelly, et al., "The Automated Collision Notification System," National Highway Traffic Safety Administration, retrieved from http://www.nhtsa.gov/DOT/%20NHTSA/NRD/Articles/EDR/PDF/Research/Automated_Collision_Notification_System.pdf, 14 pages (no date, accessed 2013).
Drive Smart, "Telematics (also known as black box) insurance," retrieved from https://drivesmartinsurance.co.uk/telematics/, 3 pages (2014).
Dyer, "Fraunhofer offers secure NFC keys that can be shared via QR codes," NFC World, retrieved from https://www.nfcw.com/2013/03/20/323184/fraunhofer-offers-secure-nfc-keys-that-can-be-shared-via-qr-codes/, 4 pages (2013).
Experienced Criminal Lawyers, "Automatic License Plate Recognition (ALPR) Scanning Systems," retrieved from https://experiencedcriminallawyers.com/articles/automatic-license-plate-recognition-alpr-scanning-systems/, 3 pages (No. date, accessed 2013).
Final Office Action on U.S. Appl. No. 14/602,969 dated Apr. 26, 2018, 29 pages.
Final Office Action on U.S. Appl. No. 14/602,969 dated Jun. 14, 2019, 10 pages.
Final Office Action on U.S. Appl. No. 15/493,685 dated Feb. 5, 2020, 47 pages.
Freeman, "How OnStar Works," retrieved from https://auto.howstuffworks.com/onstar.htm, 15 pages (2006).
Freeman, "This App Turns Smartphones Into Safe Driving Tools," Mashable, retrieved from https://mashable.com/archive/drivescribe-app-safe-driving, 3 pages (2012).
Funke, et al., "Automated Collision Notification (ACN) Field Operational Test (FOT) Final Report," National Highway Traffic Safety Administration, retrieved from https://www.nhtsa.gov/DOT/NHTSA/NRD/Multimedia/PDFs/Crash%20Avoidance/2000/ACNFinal.pdf, 55 pages (2000).
Girls Drive Better, "Telematics: FAQs," retrieved from https://girlsdrivebetter.com/telematics-insurance-faqs/, 5 pages (2014).
Google Play Store , "GEICO App," retrieved from https://play.google.com/store/apps/details?id=com.geico.mobile&hl=en, 3 pages (2013).
Hakim, "Insurance telematics: What is it? And why we should care.," Versik, retrieved from https://www.verisk.com/insurance/visualize/insurance-telematics-what-is-it-and-why-we-should-care/, 5 pages (2013).
Harding, "The 'Alva Cape' and the Automatic Identification System: The Use of VHF in Collision Avoidance at Sea," The Journal of Navigation 55(3), pp. 431-442 (2002).
IDL Services, "QR Code," retrieved from http://www.internationaler-fuehrerschein.com/en/the-idd/qr-code-quick-response-code-feature-in-the-idd.html on May 21, 2013.
Jeevagan, et al., "RFID based vehicle identification during collisions," IEEE 2014 Global Humanitarian Technology Conference, 5 pages (2014).
Kardas & Tunali, "Design and implementation of a smart card based healthcare information system," Computer Methods and Programs in Biomedicine 81(1), pp. 66-78 (2006).
Krishna, et al., "Design & Development of a GSM Based Vehicle Theft Control System And Accident Detection by Wireless Sensor Network," International Journal of Emerging trends in Engineering and Development 2(5), pp. 529-540 (2012).
Lahausse, et al., "The potential for automatic crash notification systems to reduce road fatalities," Annals of Advances in Automotive Medicine 52, pp. 85-92 (2008).
Lemon Wallet, "Privacy Policy," retrieved from http://lemon.com/privacy on May 20, 2013.
Maciag, "Motor Accident Insurance and Systems of Compensation," University of Alberta Thesis, 262 pages (1980).
Maxwell, "New Idea: QR Codes For License Plates," retrieved from http://andrewcmaxwell.com/2011/02/new-idea-qr-codes-for-license-plates, 6 pages (2011).
Mercedes-Benz, "mbrace: Safety & Security Services," retrieved from https://www.mbusa.com/vcm/MB/DigitalAssets/pdfmb/mbrace_Cut_Sheet_All_4_12_12_.pdf, 37 pages (2012).
Microsoft, "Microsoft Tag Implementation Guide," retrieved from http://tag.microsoft.com/resources/implementationguide.aspx, 28 pages (2010).
Naujoks, et al., "For insurance companies, the day of digital reckoning," Bain & Company, retrieved from https://www.bain.com/insights/for-insurance-companies-the-day-of-digital-reckoning/, 16 pages (2013).
Notice of Allowance for U.S. Appl. No. 17/227,542 dated Jan. 31, 2022, 11 pages.
Notice of Allowance on U.S. Appl. No. 14/602,969 dated May 14, 2020, 10 pages.
Notice of Allowance on U.S. Appl. No. 15/493,685 dated Oct. 15, 2020, 8 pages.
Notice of Allowance on U.S. Appl. No. 17/166,335 dated Apr. 6, 2023, 9 pages.
Notice of Allowance on U.S. Appl. No. 17/166,335 dated Feb. 2, 2023, 9 pages.
Notice of Allowance on U.S. Appl. No. 17/166,335 dated Sep. 8, 2022, 9 pages.
O'Reilly, "Encrypted QR Codes," retrieved from https://qrworld.wordpress.com/2011/11/27/encrypted-qr-codes/, 5 pages (2011).
Office Action for U.S. Appl. No. 17/166,335 dated Apr. 6, 2022, 19 pages.
Office Action on U.S. Appl. No. 14/602,969 dated Nov. 26, 2018, 27 pages.
Office Action on U.S. Appl. No. 14/602,969 dated Sep. 21, 2017, 31 pages.
Office Action on U.S. Appl. No. 15/493,685 dated Jul. 29, 2019, 39 pages.
Office Action on U.S. Appl. No. 17/166,335 dated Dec. 27, 2022, 18 pages.
Office Action on U.S. Appl. No. 17/827,174 dated Oct. 14, 2022, 7 pages.
Onstar, "Automatic Crash Response, Car Safety, & Emergency Services," retrieved from https://www.onstar.com/web/portal/emergencyexplore?tab=g=1 (no date, accessed 2013).
Out-Law Analysis, "Telematics data sharing, competition law and privacy rights," Pinset Masons, retrieved from https://www.pinsentmasons.com/out-law/analysis/telematics-data-sharing-competition-law-and-privacy-rights, 5 pages (2014).
Proquest, "Search Strategy from Dialog—Jan. 1, 2022 20:29," Scientific and Technical Information Center, 4 pages (2022).
Proquest, "Search Strategy from Dialog—Jan. 2, 2021 23:14," 4 pages (2022).
Proquest, "Search Strategy from Dialog—Oct. 8, 2022 22:25," Scientific and Technical Information Center, 4 pages (2022).
Quiroga, "Car Total Loss Evaluation Part IV," retrieved from http://www.auto-insurance-claim-advice.com/car-total-loss-2.html, 8 pages (2017).
Qwiktag, "New Technology Security Risks: QR codes and Near Field Communication," retrieved from http://www.qwiktag.com/index.php/knowledge-base/150-technology-security-risks-qr-codes on Nov. 13, 2013.
Samsung, "Near Field Communication: A Simple Exchange of Information," retrieved from https://www.samsung.com/us/article/near-field-communication-a-simple-exchange-of-information/ on May 21, 2013.
SAS, "Telematics: How Big Data Is Transforming the Auto Insurance Industry," SAS White Paper, 12 pages (2013).
Schmitt, "License Plate Scanner Obsoletes Meter Maid," The Truth About Cars, retrieved from https://www.thetruthaboutcars.com/2011/02/license-plate-scanner-obsoletes-meter-maid/, 3 pages (2011).

(56) References Cited

OTHER PUBLICATIONS

Smith, "Car Insurance Firms Revving up Mobile App Features," Insurance.com, retrieved from https://www.insurance.com/auto-insurance/auto-insurance-basics/car-insurance-mobile-apps.htm, 3 pages (2012).
Spevacek, et al., "Additional insured and indemnification issues affecting the insurance industry, coverage counsel, and defense counsel—legal advice and practice pointers," FDCC Quarterly 52(1), pp. 3-101 (2001).
Sunrise Signs, "Vehicle Wrap Trends: What are QR Codes and why do I need one?," retrieved from https://www.sunrisesigns.com/our-blog/bid/34661/Vehicle-Wrap-Trends-What-are-QR-Codes-and-why-do-I-need-one, 4 pages (2010).
Thompson, et al., "Using Smartphones to Detect Car Accidents and Provide Situational Awareness to Emergency Responders," International Conference on Mobile Wireless Middleware, Operating Systems, and Applications, Mobilware 2010, pp. 29-42 (2010).
TMC News, "ATX Launches Enhanced Automatic Collision Notification for BMW," retrieved from http://www.tmcnet.com/2009/01/11/3905139.htm, 2 pages (2009).
Travelers, "Understanding Total Loss," retrieved from https://www.travelers.com/claims/guides/understanding-total-loss, 4 pages (2017).
Vemoco, "What is insurance telematics?," retrieved from https://vemoco.com/en/insurance, 4 pages (2014).
Verma, et al., "A Study of US Crash Statistics from Automated Crash Notification Data," 20th International Technical Conference on the Enhanced Safety of Vehicles, pp. 1-5 (2007).
Weiss, et al., "Top 10 Technology Trends Impacting Life and P&C Insurers in 2013," Gartner, 19 pages (2013).
Wikipedia, "Bump (application)," retrieved from https://en.wikipedia.org/wiki/Bump_(application) on Aug. 29, 2013.

* cited by examiner

MACHINE LEARNING BASED ACCIDENT ASSESSMENT

CROSS-REFERENCE TO RELATED APPLICATIONS

This application is a continuation of U.S. patent application Ser. No. 17/166,335, filed Feb. 3, 2021, now U.S. Pat. No. 11,720,971, which is a continuation of U.S. patent application Ser. No. 15/493,685, filed Apr. 21, 2017, now U.S. Pat. No. 10,937,103, the contents of which are incorporated herein by reference in their entireties.

TECHNICAL FIELD

Aspects described herein are generally related to systems and devices for accident assessment. More specifically, aspects described herein relate to using machine learning algorithms to assess vehicle operational data.

BACKGROUND

In some instances, an incident and/or accident may cause damage to a vehicle. The timely determination of the extent of the damages to the vehicle (e.g., whether the accident resulted in a total loss of the vehicle) may be paramount in ensuring the safety of those affected by the incident and/or accident, as well the integrity of the property or vehicle involved. In conventional accident assessment systems, however, an inspection is required to determine the extent of damages to a vehicle after an accident, which is dependent on the availability of the inspector, and can result in owners driving vehicles unfit for operation.

SUMMARY

Aspects of the disclosure address these and/or other technological shortcomings by using machine learning algorithms to assess vehicle operational data associated with a vehicle accident. In particular, one or more aspects of the disclosure provide effective, efficient, scalable, and convenient technical solutions that address and overcome the technical problems associated with accident assessment systems. For example, one or more aspects of the disclosure provide techniques for using machine learning algorithms to identify whether an accident resulted in a total loss.

In accordance with one or more embodiments, an accident assessment server having at least one processor, communication interface and memory, may receive, via the communication interface, from a telematics device associated with a vehicle, data indicating that the vehicle was involved in an accident. The accident assessment server may compare, via machine learning algorithms, the received data with other known data to identify whether the accident resulted in a total loss. Responsive to determining that the accident resulted in the total loss, the accident assessment server may request, by the communication interface, further information regarding the vehicle from the telematics device. The accident assessment server may identify, based on the received data and further data, a baseline value range for the vehicle. The accident assessment server may request, by the communication interface, from a mobile device associated with an owner of the vehicle, updated information regarding the vehicle. The accident assessment server may receive, by the communication interface, updated information from the mobile device of the owner of the vehicle. The accident assessment server may identify, based on the updated information, a final value of the vehicle.

In some embodiments, responsive to determining that the final value of the vehicle is within the baseline value range of the vehicle, the accident assessment server may provide payment to the owner corresponding to the final value of the vehicle.

In some embodiments, the updated information includes one or more of exact mileage, presence of aftermarket parts (e.g., parts or materials purchased and/or installed on a vehicle after manufacture of the vehicle and purchase by a user), and vehicle specification information associated with the vehicle and the received data indicating that the vehicle was involved in the accident includes one or more of an indication of airbag deployment, an indication of vehicle impact, a deceleration value above a first predetermined threshold, and a braking force value above a second predetermined threshold.

In some embodiments, to compare the received data with the other known data to identify whether the accident resulted in the total loss, the accident assessment server may identify, based on the received data, a make, model, and year associated with the vehicle involved in the accident. The accident assessment server may sort one or more databases based on the make model and year associated with the vehicle and compare, via the machine learning algorithms, other known data associated with one or more vehicles of the make, model, and year corresponding to the vehicle.

In some embodiments, the accident assessment server may search one or more databases storing information associated with the vehicle which may include a vehicle identification number (VIN) database, used car listing database, vehicle history database, vehicle maintenance history database, state department of motor vehicle database, and insurance claims database In some embodiments, to identify a baseline value range for the vehicle, the loss assessment server may search one or more databases storing vehicle value data based on the received data and further data associated with the vehicle.

In some embodiments, responsive to determining that the final value of the vehicle is not within the baseline value range of the vehicle, the accident assessment server may schedule a vehicle inspection appointment with the owner of the vehicle.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1A:
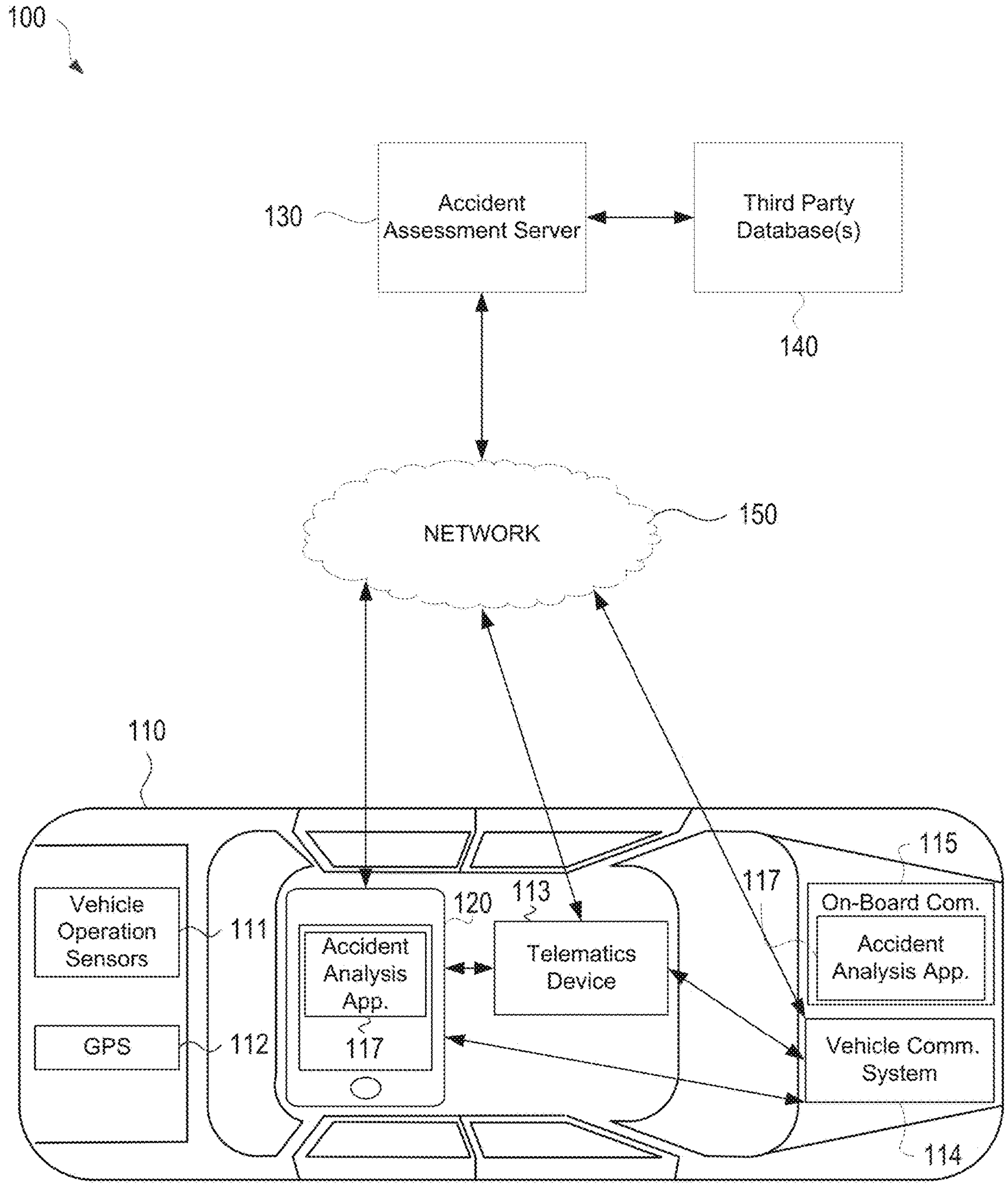
FIGS. 1A and 1B depict an illustrative computing environment for machine learning based accident assessment in accordance with one or more aspects of the disclosure.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

As will be described in further detail below, a vehicle comprising a plurality of sensors and communication devices may be involved in an accident. The vehicle operational data of the vehicle may be determined by the plurality of sensors at the time of the accident and may be transmitted by one or more of the communication devices to an accident assessment server. At the accident assessment server, machine learning algorithms may be utilized to compare the vehicle operational data with other known and/or available vehicle operational data to determine whether the accident resulted in a total loss of the vehicle.

In some instances, if it is determined that the accident caused a total loss, the accident assessment server may request further information about the vehicle from one or more electronic devices of the vehicle (e.g., telematics device, on-board computer, and the like). The further information, in addition to the vehicle operational data at the time of the accident, may be used to identify a baseline value range for the vehicle prior to the occurrence of the accident. The accident assessment server may transmit a request for updated information regarding the vehicle to a mobile device associated with the owner of the vehicle and may receive updated vehicle information in return. The updated vehicle information may be used to identify a final value of the vehicle before the accident occurred. In some cases, if the final value of the vehicle is within the baseline value range for the vehicle, the accident assessment server may provide payment to the owner of the vehicle of an amount corresponding to the final value.

FIG. 1A depicts an illustrative computing environment for machine learning based accident assessment in accordance with one or more aspects of the disclosure. The accident assessment system 100 may include vehicle 110, accident assessment server 130, and one or more third party databases 140. The vehicle 110 may include one or more components associated therewith such as vehicle operation sensors 111, GPS 112, telematics device 113, vehicle communication system 114, on-board computer 115, and the like. Additionally, mobile computing device 120 may be included in vehicle 110. In some instances, the mobile device 120 may be associated with an owner, driver, or passenger of vehicle 110. The vehicle 110 and one or more components associated therewith (e.g., vehicle operation sensors 111, GPS 112, telematics device 113, vehicle communication system 114, on-board computer 115, and the like), mobile device 120, accident assessment server 130, and one or more third party databases 140 may be configured to communicate with each other through network 150. Each component shown in FIG. 1A may be implemented in hardware, software, or a combination of the two. Additionally, each component of the accident assessment system 100 may include a computing device (or system) having some or all of the structural components described below in regard to computing device 401 of FIG. 4.

Vehicle 110 of the accident assessment system 100 may be an automobile, motorcycle, scooter, bus, van, truck, semi-truck, train, boat, recreational vehicle, or other vehicle. The vehicle 110 may further be an autonomous vehicle, semi-autonomous vehicle, or non-autonomous vehicle. In some examples, vehicle 110 may include vehicle operation/performance sensors 111 capable of detecting, recording, and transmitting various vehicle performance and/or operational data and environmental conditions data. For example, sensors 111 may detect, store, and transmit data corresponding to the vehicle's speed, rates of acceleration and/or deceleration, braking, swerving, and the like. Sensors 111 also may detect, store and/or transmit data received from the vehicle's internal systems, such as impact to the body of the vehicle, air bag deployment, headlight usage, brake light operation, door opening and closing, door locking and unlocking, cruise control usage, hazard light usage, windshield wiper usage, horn usage, turn signal usage, seat belt usage, phone and radio usage within the vehicle, internal decibel levels, and other data collected by the vehicle's computer systems.

Sensors 111 also may detect, store, and/or transmit data relating to moving violations and the observance of traffic signals and signs by the vehicle 110. Additional sensors 111 may detect, store, and transmit data relating to the maintenance of the vehicle 110, such as the engine status, oil level, maintenance levels and/or recommendations, engine coolant temperature, odometer reading, the level of fuel in the fuel tank, engine revolutions per minute (RPMs), and/or tire pressure.

The sensors 111 of vehicle 110 may further include one or more cameras and proximity sensors capable of recording additional conditions inside or outside of the vehicle 110. Internal cameras may detect conditions such as the number of the passengers in the vehicle 110, and potential sources of driver distraction within the vehicle (e.g., pets, phone usage, and unsecured objects in the vehicle). External cameras and proximity sensors may be configured to detect environmental conditions data such as nearby vehicles, vehicle spacing, traffic levels, road conditions and obstacles, traffic obstructions, animals, cyclists, pedestrians, precipitation levels, light levels, sun position, and other conditions that may factor into driving operations of vehicle 110.

Additionally, vehicle sensors 111 may be configured to independently transmit the above-mentioned data to one or more computing devices and/or systems including telematics device 113, on-board computer 115, mobile device 120, and/or accident assessment server 130. In some instances, the data transmission to the mobile device 120 and/or accident assessment server 130 may be performed via on-board computer 115. In such cases, the on-board computer 115 may be configured to transmit the data received from vehicle sensors 111 to mobile device 120 and/or accident assessment server 130 by way of vehicle communication system 114.

Vehicle 110 may include a Global Positioning System (GPS) 112 which may be used to generate data corresponding to the position, heading, orientation, location, velocity, and/or acceleration of vehicle 110. GPS 112 may be configured to independently transmit the above-mentioned data to one or more computing systems including telematics device 113, on-board computer 115, mobile device 120, and/or accident assessment server 130. In some instances, the data transmission to the mobile device 120 and/or accident assessment server 130 may be performed via on-board computer 115. In such cases, the on-board computer 115 may be configured to transmit the data received from GPS 112 to mobile device 120 and/or accident assessment server 130 by way of vehicle communication system 114.

Telematics device 113 may be configured to receive vehicle performance and/or operational data and environmental conditions data in the form of a data stream from on-board computer 115 via a data port, Bluetooth interface, or any comparable communication interface of the vehicle 110. For example, telematics device 113 may include an on-board diagnostic (OBD) device adapter and may be connected to an OBD port of the vehicle 110 through which on-board computer 115 may be configured to transmit data to telematics device 113. In certain embodiments, telematics device 113 may be configured to receive vehicle performance and/or operational data and environmental conditions data directly from vehicle sensors 111, GPS 112, on-board computer 115, and/or mobile device 120 via a wired or wireless connection. Telematics device 113 may include a memory to store data received from vehicle sensors 111, GPS 112, on-board computer 115, and/or mobile device 120.

The vehicle performance and/or operational data may be collected with appropriate permissions (e.g., from the driver, vehicle owner, etc.) and may include operational data from an industry standard port such as a SAE-1962 connector, or an on board diagnostic ("OBD") port or other vehicle data acquiring component. For example, operation data accessible via the OBDII port includes speed and engine throttle position or other variable power controls of the vehicle power source. It may also include so called "extended OBDII" or OBDIII datasets that are specific to each manufacturer and also available with manufacturer permission such as odometer reading, seat belt status, activation of brakes, degree and duration of steering direction, etc., and implementation of accident avoidance devices such as turning signals, headlights, seatbelts, activation of automated braking systems (ABS), etc. Other information regarding the operation of the vehicle may be collected such as, but not limited to, interior and exterior vehicle temperature, window displacement, exterior vehicle barometric pressure, exhaust pressure, vehicle emissions, turbo blower pressure, turbo charger RPM, vehicle GPS location, etc. The system may recognize or be configured to recognize a particular language emitted by the vehicle system and may configure the recording component to receive or convert data in SAE J1850, ISO IS09141 or KWP 2000 formats. Accordingly, U.S. and/or international OBD standards may be accommodated. For instance, data may be collected from a variety of U.S. and/or international port types to permit use in a variety of locations. Alternatively, this step may be performed by a processor after the data is recorded.

Telematics device 113 may also include sensors such as, but not limited, an accelerometer, compass, gyroscope, and GPS. Additionally, telematics device 113 may include antennas to communicate with other devices wirelessly. For example, telematics device 113 may communicate with on-board computer 115, mobile device 120, and/or accident assessment server 130 over a wide area network (WAN), cellular network, Wi-Fi network, and the like. Telematics device 113 may also communicate with on-board computer 115 and mobile device 120 via a Bluetooth connection. In certain embodiments, telematics device 113 may be configured to establish a secure communication link and/or channel with on-board computer 115, mobile device 120, and/or accident assessment server 130.

In some arrangements, telematics device 113 may include a telematics application operating on on-board computer 115 and/or mobile computing device 120 and may utilize hardware components comprised within on-board computer 115 and/or mobile computing device 120 (e.g., memory, processors, communication hardware, etc.) to receive, store, and/or transmit vehicle performance and/or operational data and environmental conditions data.

Vehicle communication systems 114 may be vehicle-based data transmission systems configured to transmit vehicle information and operational data to external computing systems and/or other nearby vehicles and infrastructure, and to receive data from external computing systems and/or other nearby vehicles and infrastructure. In some examples, communication systems 114 may use the dedicated short-range communications (DSRC) protocols and standards to perform wireless communications between vehicles and/or external infrastructure such as bridges, guardrails, barricades, and the like.

Vehicle communication systems 114 may be implemented using wireless protocols such as WLAN communication protocols (e.g., IEEE 802.11), Bluetooth (e.g., IEEE 802.15.1), one or more of the Communication Access for Land Mobiles (CALM) wireless communication protocols and air interfaces, and the like. In certain systems, communication systems 114 may include specialized hardware installed in vehicle 110 (e.g., transceivers, antennas, etc.) to facilitate near field communication (NFC) and/or radio-frequency identification (RFID), while in other examples the communication systems 114 may be implemented using existing vehicle hardware components (e.g., radio and satellite equipment, navigation computers). In some instances, the vehicle communication systems 114 may be configured to transmit and receive data from vehicle sensors 111, GPS 112, telematics device 113, on-board computer 115, mobile device 120, accident assessment server 130, and/or one or more third party databases 140 over a wide area network (WAN), cellular network, Wi-Fi network, Bluetooth, RFID, and/or NFC.

Figure 4:
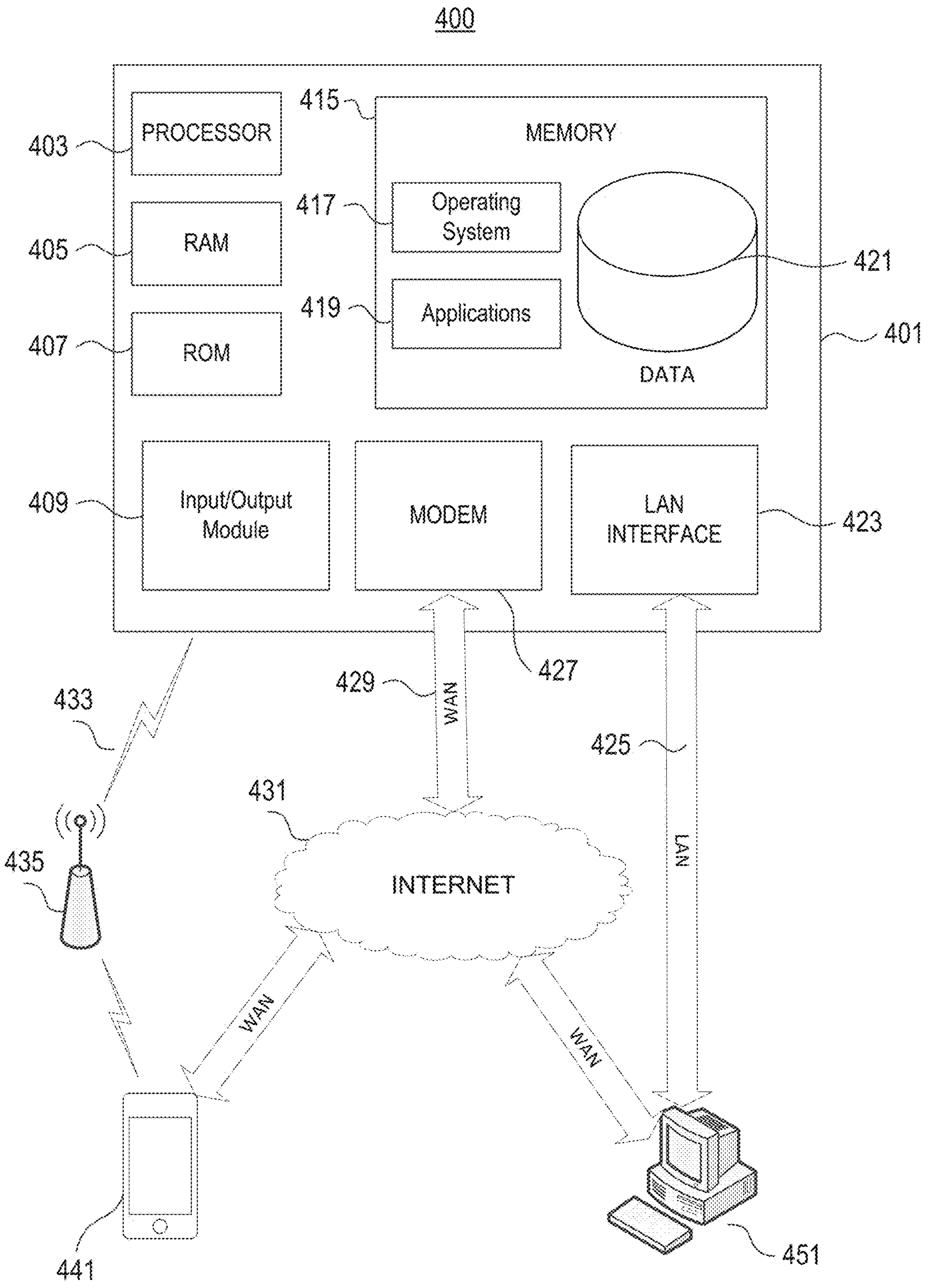
FIG. 4 illustrates a network environment and computing systems that may be used to implement one or more aspects of the disclosure.

On-board computer 115 may contain some or all of the hardware/software components as the computing device 401 of FIG. 4. Vehicle control computer 115 may be configured to operate one or more internal vehicle systems and/or components including at least a vehicle sound system, dashboard display and/or heads-up display system, output speakers, interior lighting system, climate control system, ignition system, door locking system, and the like. Similarly, on-board computer 115 may be configured to operate one or more external vehicle systems and/or components including windshield wipers, exterior lighting systems (e.g., headlights, tail lights, running lights, turn signals, emergency lights, etc.), emission and exhaust systems, fuel systems, suspension systems, transmission systems, and the like. In some instances, vehicle control computer 115 may be configured to perform the accident assessment methods as described in further detail below in conjunction with mobile computing device 120, accident assessment server 130, and/or one or more third party databases 140.

Additionally, on-board computer 115 may include a display screen for presenting information to a driver of vehicle 110 pertaining to any of a plurality of applications such as a telematics application, accident assessment application 117, and the like. In some instances, the display screen may be a touch screen and may be configured to receive user touch input. Alternatively, the display screen may not be a touch screen and, instead, the on-board computer 115 may receive user input and provide output through one or more of the input/output modules 409 described in detail in regard to FIG. 4.

Mobile computing device 120 may be, for example, a mobile phone, personal digital assistant (PDA), or tablet computer associated with the driver or passenger(s) of vehicle 110. As such, mobile computing device 120 may be included within the vehicle 110 and, in some instances, may be used to independently collect vehicle driving data and/or to receive vehicle driving and operational/performance data, environmental conditions data, accident assessment data, other known data (e.g., historical vehicle operational data and environmental conditions data associated with historical vehicle accidents, last known vehicle mileage data, original manufacturer factory options data, etc.), and the like from one or more computing systems (e.g., vehicle operation sensors 111, GPS 112, telematics device 113, on-board computer 115, accident assessment server 130, and/or one or more third party databases 140). In one example, software applications executing on mobile computing device 120 (e.g., telematics application and/or accident assessment application 117) may be configured to independently detect driving data and/or to receive vehicle driving data and/or environmental conditions data, accident assessment data, other known data, and the like from one or more internal and/or external computing systems. With respect to independent vehicle data detection and collection, mobile device 120 may be equipped with one or more accelerometers and/or GPS systems which may be accessed by software applications executing on mobile computing device 120 to determine vehicle location (e.g., longitude, latitude, and altitude), heading (e.g., orientation), velocity, acceleration, direction, and other driving data. As stated above, mobile computing device 120 may be configured to transmit the independently collected vehicle driving data and/or the received vehicle driving data, environmental conditions data, accident assessment data, other known data, and the like to one or more computing devices (e.g., telematics device 113, on-board computer 115, and/or accident assessment server 130).

Additionally, mobile computing device 120 may be configured to perform one or more of the methods and/or processes corresponding to the accident assessment as described in further detail below in conjunction with on-board computer 115 and/or accident assessment server 130. In performing such methods, mobile device 120 may be configured to detect and store vehicular operational and/or navigation data, and may be further configured to transmit the vehicular operational and/or navigation data to on-board computer 115 and/or accident assessment server 130. Furthermore, mobile device 120 may be configured to receive vehicle operational data, environmental conditions data, accident assessment data, other known data, and/or data produced during the performance of the methods corresponding to the accident assessment from sensors 111, GPS 112, telematics device 113, on-board computer 115, accident assessment server 130, and/or one or more third party databases 140.

The accident assessment analysis system 100 may include an accident assessment server 130. The accident assessment server 130 may be a computing device containing some or all of the hardware/software components as the computing device 401 of FIG. 4. In some instances, the analysis of the vehicular data, accident data, other known data, and the like, as described in further detail below, may be performed by accident assessment server 130. In such instances, any one, or combination of, sensors 111, GPS 112, telematics device 113, on-board computer 115, mobile device 120, and one or more third party databases 140 may transmit data to accident assessment server 130. Such data may include any of the above-mentioned vehicle driving and operational/performance data, environmental conditions data, other known data, and the like. Upon receipt of the data, accident assessment server 130, alone or in combination, with mobile device 120 and/or on-board computer 115 may be able to perform the processes outlined below.

The one or more third party databases 140 may contain some or all of the hardware/software components as the computing device 401 of FIG. 4. Each of the one or more third party databases may be respectively associated with a particular entity related to the management, purchase, repair, and the like of vehicles. In particular, each of the one or more third party databases may be a Department of Motor Vehicles (DMV) database, insurance company database, vehicle identification number (VIN) database, used car listing database, automotive sales database (e.g., recently sold vehicles database), vehicle history database, vehicle maintenance history database, vehicle manufacturer options database, predicted vehicle value database, and the like. As such, each of the one or more third party databases 140 may store data corresponding to a vehicle (e.g., vehicle 110) and/or information corresponding to and/or, for determining, a predicted final value of the vehicle such as at least the other known data mentioned above. Such data may be related to vehicle operational data (e.g., last known vehicle mileage), vehicle specification data (e.g., vehicle manufacturer part information associated with the vehicle 110), accident and insurance claims data, registration and ownership data, vehicle value data, and the like. Specifically, each of the one or more third party databases 140 may store data such as vehicle mileage, vehicle accident history and vehicle operational data corresponding to accidents, total loss data and corresponding vehicle operational data, and the like. Additionally, the one or more third party databases 140 may be configured to receive and transmit data to telematics device 113, on-board computer 115, mobile device 120, and accident assessment server 130.

As stated above, computing environment 100 also may include one or more networks, which may interconnect one or more of vehicle 110 and the components associated therewith (e.g., vehicle operation sensors 111, GPS 112, telematics device 113, vehicle communication system 114, on-board computer 115, and the like), mobile device 120, accident assessment server 130, and one or more third party databases 140. For example, computing environment 100 may include network 150. Network 150 may include one or more sub-networks (e.g., local area networks (LANs), wide area networks (WANs), or the like).

Figure 1B:
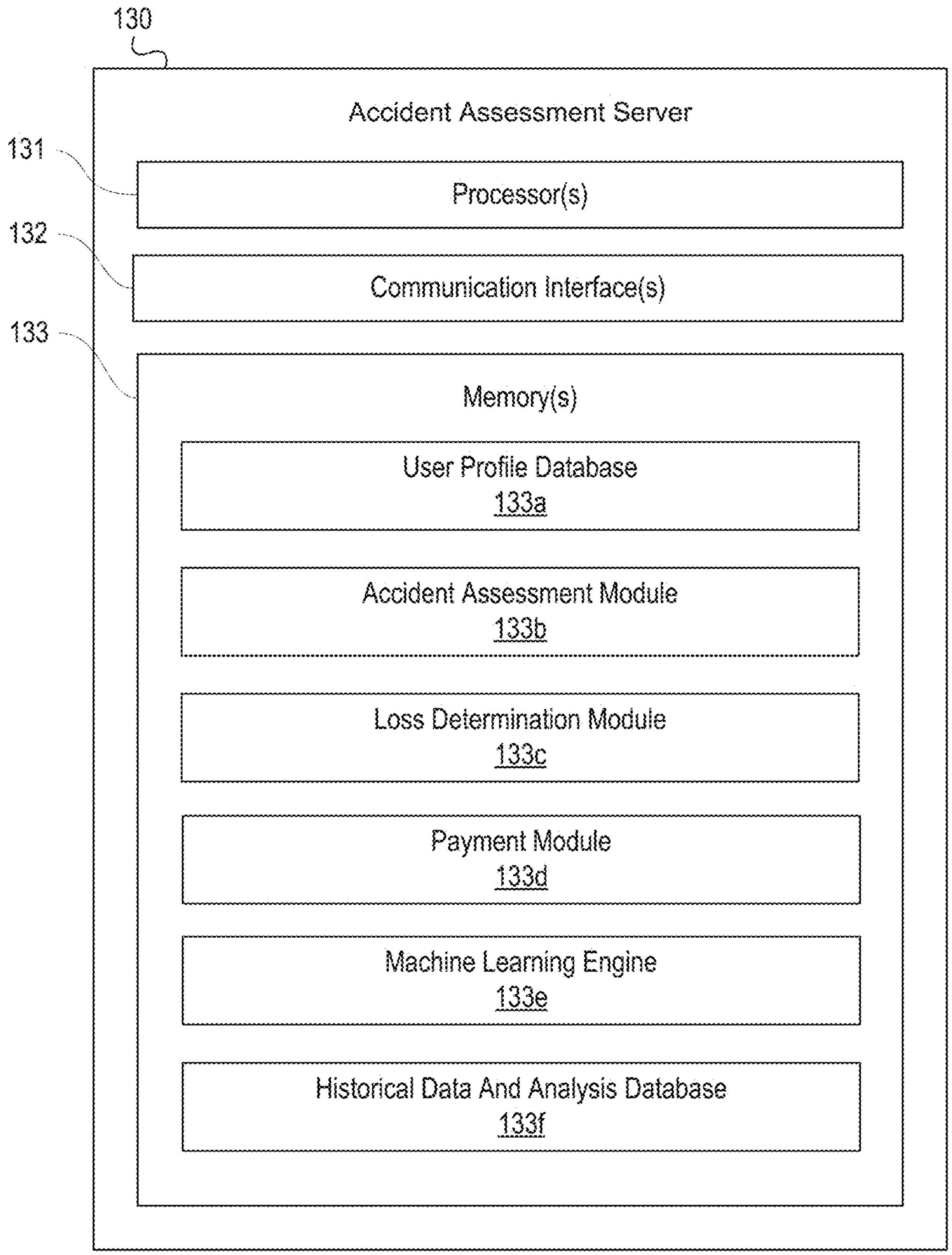

Referring to FIG. 1B, accident assessment server 130 may include processor(s) 131, communication interface(s) 132, and memory 133. A data bus may interconnect processor(s) 131, communication interface(s) 132, and memory 133. Communication interface(s) 132 may be a network interface configured to support communication between accident assessment server 130 and one or more networks (e.g., network 150).

Memory 133 may include one or more program modules having instructions that when executed by processor(s) 131 cause accident assessment server 130 to perform one or more functions described herein and/or one or more databases that may store and/or otherwise maintain information which may be used by such program modules and/or processor(s) 131. In some instances, the one or more program modules and/or databases may be stored by and/or maintained in different memory units of accident assessment server 130. For example, memory 133 may have, store, and/or include a user profile database 133*a*, accident assessment module 133*b*, loss determination module 133*c*, payment module 133*d*, machine learning engine 133*e*, and historical data and analysis database 133*f*.

User profile database 133*a* may store information corresponding to an owner of vehicle 110. Such information may relate to insurance account information associated with the owner, vehicle information associated with the owner, financial information associated with the owner, and information as pertaining to the owner's usage of the accident assessment module 133*b*, loss determination module 133*c*, payment module 133*d*, machine learning engine 133*e*, and historical data and analysis database 133*f*, as described in further detail below.

Accident assessment module 133*b* may have instructions that direct and/or cause accident assessment server 130 to receive vehicle operational data from one or more of vehicle 110 and one or more components associated therewith (e.g., vehicle operation sensors 111, GPS 112, telematics device 113, vehicle communication system 114, on-board computer 115, and the like) and mobile device 120. The accident assessment module 133*b* may have further instructions that direct and/or cause accident assessment server 130 to identify, based on the received vehicle operational data, whether vehicle 110 has been involved in an accident. Additionally, accident assessment module 133*b* may perform other functions, as discussed in greater detail below.

Loss determination module 133*c* may have or include instructions that direct and/or cause accident assessment server 130 to identify, based on the vehicle operational data indicating an accident occurred, whether or not the accident resulted in a total loss. In particular, loss determination module 133*c* may utilize machine learning engine 133*e* to compare the vehicle operational data indicating the occurred with historical accident data corresponding to a total loss in historical data and analysis database 133*f* to identify whether or not the accident resulted in a total loss.

Payment module 133*d* may have or include instructions that allow accident assessment server 130 to provide payment to an owner of vehicle 110. In some instances, payment to the owner of vehicle 110 by payment module 133*d* of accident assessment server 130 may be performed if loss determination module 133*c* identifies that the accident resulted in a total loss.

Machine learning engine 133*e* may have or include instructions that direct and/or cause accident assessment server 130 to set, define, and/or iteratively redefine parameters, rules, and/or other settings stored in historical data and analysis database 133*f* and used by accident assessment module 133*b* and loss determination module of accident assessment server 130 in performing the accident assessment, loss determination, and the like.

Historical data and analysis database 133*f* may be configured to store historical data and other known data corresponding to information associated with vehicle 110, vehicle operational data of previous accidents, as well as analysis data corresponding to past performances of accident assessment and loss determination. As stated above, in some instances, such data may be utilized by machine learning engine 133*e* to calibrate machine learning algorithms used by analysis module 133*b* and loss determination module of accident assessment server 130 in performing the accident assessment, loss determination, and the like.

FIGS. 2A, 2B, 2C, 2D, 2E, and 2F depict an illustrative event sequence for machine learning based accident assessment in accordance with one or more aspects of the disclosure. The event sequence described below in regard to FIGS. 2A, 2B, 2C, 2D, and 2E may include processing steps performed in response to an incident and/or accident involving real property or a vehicle of a user or dispatch requester. While the steps shown in FIGS. 2A, 2B, 2C, 2D, and 2E are presented sequentially, the steps need not follow the sequence presented and may occur in any order.

Figure 2A:
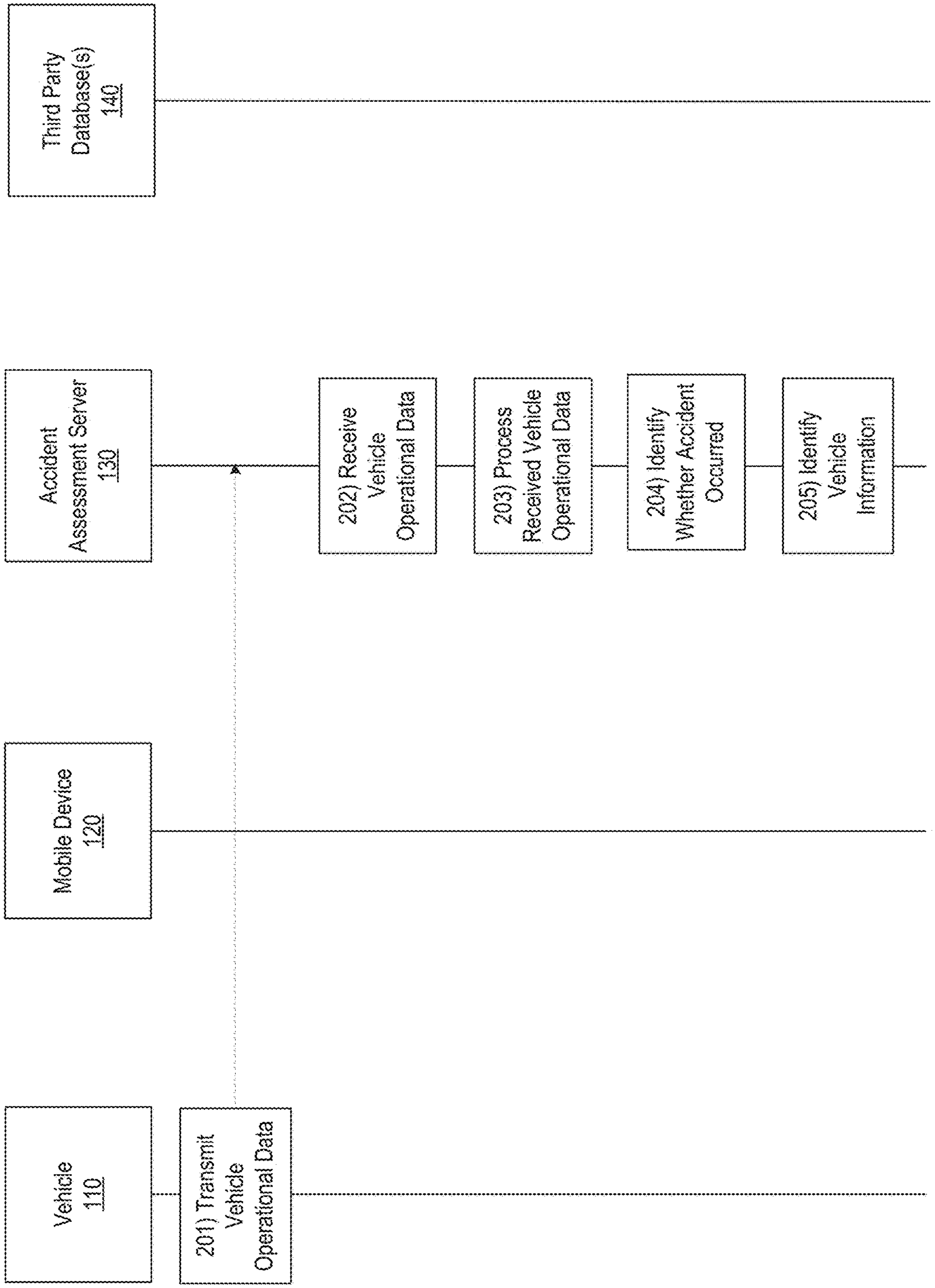
FIGS. 2A, 2B, 2C, 2D, 2E, and 2F depict an illustrative event sequence for machine learning based accident assessment in accordance with one or more aspects of the disclosure.

Referring to FIG. 2A, at step 201, vehicle 110 may transmit vehicle operational data to accident assessment server 130. In some instances, the vehicle operational data may be transmitted by one or more of vehicle operation sensors 111, GPS 112, telematics device 113, vehicle communication system 114, on-board computer 115, and the like as one or more electronic signals. Additionally and/or alternatively, the vehicle operational data may be transmitted by mobile device 120. The vehicle operational data may include all of the items of the vehicle operational data listed above, or a portion of the vehicle operational data (e.g., velocity, rates of acceleration and/or deceleration, braking, swerving, impact to the body of the vehicle, air bag deployment, and the like). In some instances, the data indicating that the vehicle was involved in the accident includes one or more of an indication of airbag deployment, an indication of vehicle impact, a deceleration value above a first predetermined threshold, and/or a braking force value above a second predetermined threshold.

At step 202, the accident assessment module 133*b* of accident assessment server 130 may receive the vehicle operational data (e.g., one or more electronic signals) from one or more of vehicle operation sensors 111, GPS 112, telematics device 113, vehicle communication system 114, on-board computer 115, and the like. At step 203, the accident assessment module 133*b* may process the received one or more electronic signals corresponding to the vehicle operational data. In particular, the accident assessment module 133*b* may perform one or more of smoothing, filtering, transforming (e.g., Fourier Transform, Discrete Fourier Transform, Fast Fourier Transform, and the like), companding, limiting, noise gating, and the like to isolate the vehicle operational data from the electronic signal sent from one or more of vehicle operation sensors 111, GPS 112, telematics device 113, vehicle communication system 114, on-board computer 115, and the like comprising the vehicle operational data.

At step 204, the accident assessment module 133*b* of accident assessment server 130 may identify whether vehicle 110 was involved in an accident, based on the vehicle operational data received by way of the communication interface(s) 132. For example, accident assessment server 130 may receive vehicle operational data indicating that vehicle 110 has decelerated from 45 mph to 0 mph with high rotational velocity (e.g., swerving) and air bag deployment. Such data, when analyzed by the accident assessment module 133*b* of accident assessment server 130, may indicate that vehicle 110 has been involved in an accident. In some instances, the accident assessment module 133*b* of accident assessment server 130 may receive telematics data corresponding at least in part to impact data from pressure sensors on the body of the vehicle 110, which may indicate that vehicle 110 has been involved in an accident. At step 205, the loss determination module 133*c* of accident assessment server 130 may identify vehicle information from the received vehicle operational data. In some instances, the vehicle information may include a make, model, and year associated with the vehicle involved in the accident.

Figure 2B:
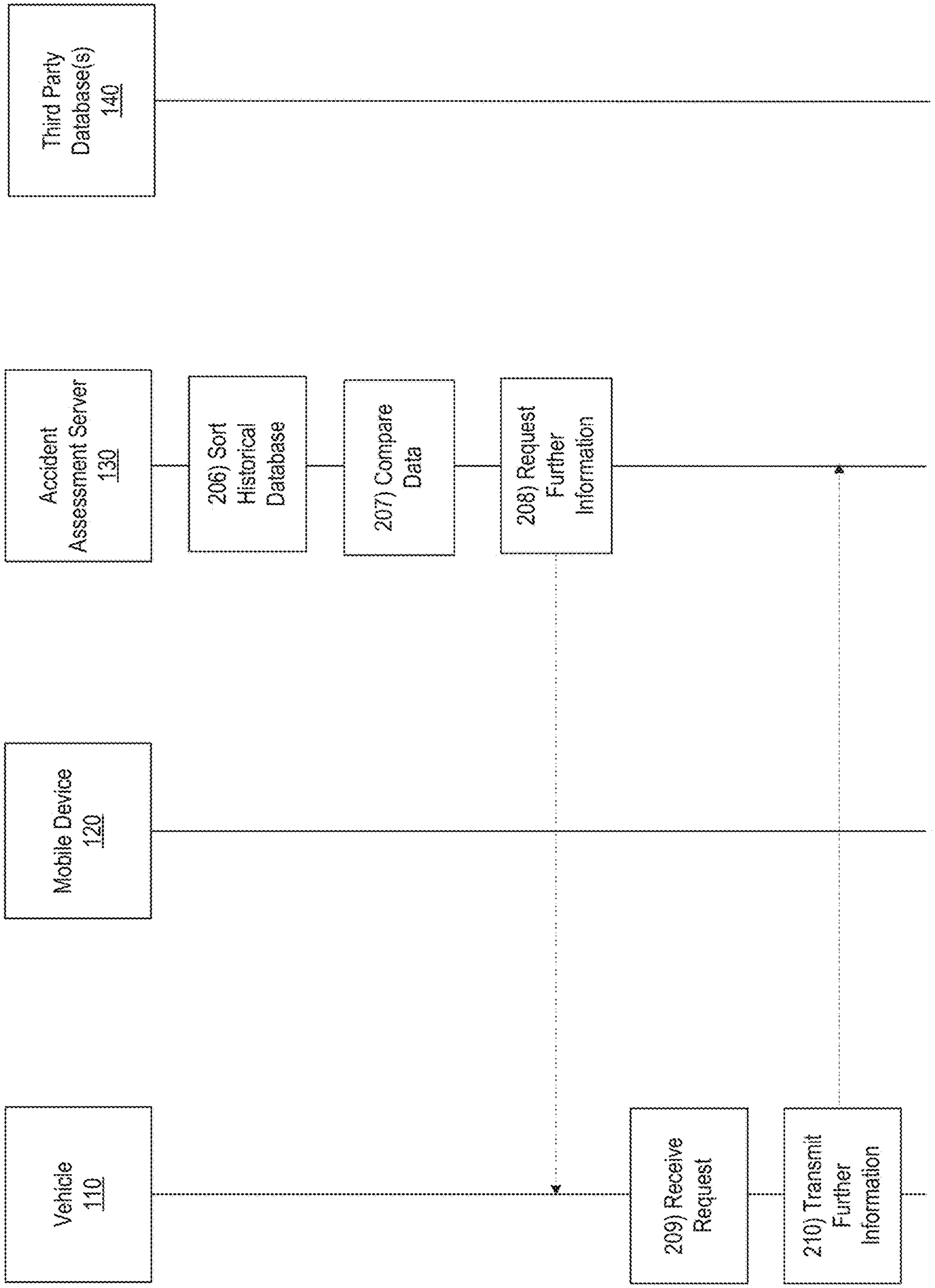

Referring to FIG. 2B, at step 206, the loss determination module 133*c* of the accident assessment server 130 may sort historical data and analysis database 133*f* based on the make, model, and year of the vehicle involved in the accident. In doing so, the loss determination module 133*c* may isolate data associated with previous accident assessments corresponding to the make, model, and year associated with the vehicle involved in the accident.

At step 207, the loss determination module 133*c* of accident assessment server 130 may compare the received vehicle operational data with the isolated data associated with previous accident assessments corresponding to the make, model, and year corresponding to the vehicle involved in the accident to identify whether the accident resulted in a total loss. In some instances, machine learning algorithms may be utilized by loss determination module 133*c* in performing the comparison. As such, loss determination module 133*c* may use machine learning engine 133*e* to compare the received vehicle telematics data with the vehicle telematics data of the isolated data associated with previous accident assessments corresponding to the make, model, and year associated with the vehicle involved in the accident. Such a comparison may identify one or more entries in historical data and analysis database 133*f* corresponding to the make, model, and year associated with the vehicle involved in the accident that were involved in accidents resulting in a total loss.

At step 208, responsive to determining that the accident resulted in a total loss of the vehicle, the accident assessment server 130 may request, by way of the communication interface(s) 132, further information regarding the vehicle from vehicle 110. In particular, the accident assessment server 130 may request further information regarding the vehicle 110 from one or more of vehicle operation sensors 111, GPS 112, telematics device 113, vehicle communication system 114, on-board computer 115, and the like.

In some instances, the accident assessment server 130 may be configured to control, command, and/or instruct one or more of the vehicle operation sensors 111, GPS 112, telematics device 113, vehicle communication system 114, on-board computer 115, and the like to transmit further information associated with vehicle 110 based on information needed to identify a baseline value range for the vehicle 110 as described below. For example, accident assessment server 130 may be configured to compare the vehicle operational data received at step 202 with data entries stored in historical data and analysis database 133*f* used to identify baseline value ranges for other vehicles. Based on the comparison, accident assessment server 130 may identify one or more data values needed to identify a baseline value range for vehicle 110. The accident assessment server 130 may be configured to control, command, and/or instruct one or more of the vehicle operation sensors 111, GPS 112, telematics device 113, vehicle communication system 114, on-board computer 115, and the like to transmit the identified data needed to identify the baseline value range for vehicle 110.

At step 209, the vehicle 110 (e.g., vehicle operation sensors 111, GPS 112, telematics device 113, vehicle communication system 114, on-board computer 115, and the like) may receive the request for further information and at step 210, may transmit the further information to accident assessment server 130. In some instances, the further information may correspond to vehicle specification information (e.g., vehicle part information) such as engine type, vehicle upgrade information (e.g., navigation system, sun roof, power windows, rim size, sound system, etc.), and the like. Furthermore, such information may include vehicle mileage information and vehicle maintenance information.

Figure 2C:
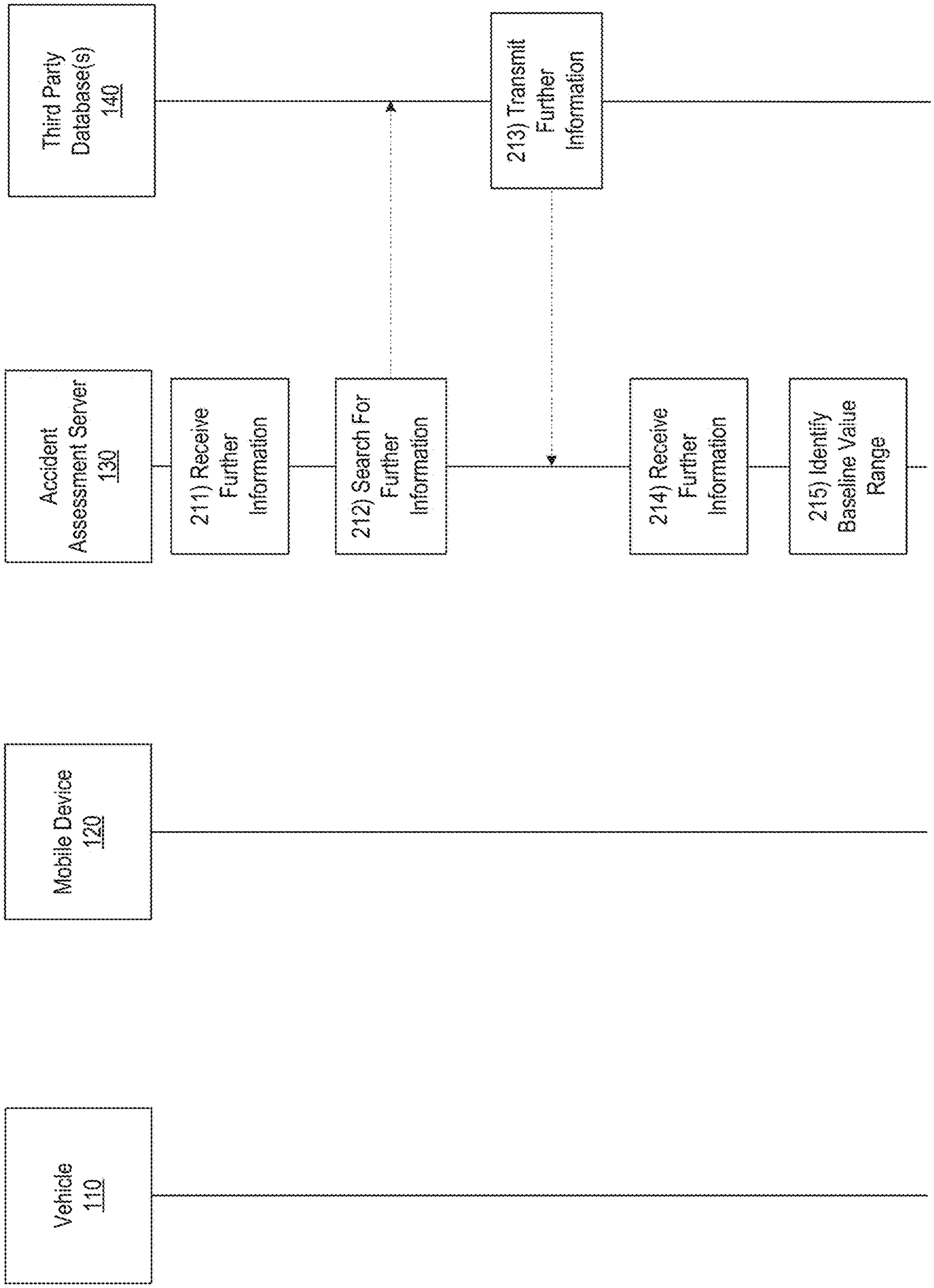

Referring to FIG. 2C, at step 211, the accident assessment server 130 may receive the further information from the vehicle 110 (e.g., vehicle operation sensors 111, GPS 112, telematics device 113, vehicle communication system 114, on-board computer 115, and the like).

Additionally and/or alternatively, the accident assessment server 130 may be configured to request the information needed to identify the baseline value range for the vehicle 110 from one or more third party databases 140. In some instances, the searching of the one or more of the third party databases 140 may be performed if the further information is not received from vehicle 110. In particular, accident assessment server 130, by way of loss determination module 133*c* and communication interface(s) 132, may request information associated with vehicle 110 such as original manufacturer factory options regarding vehicle parts, the last known mileage, and vehicle maintenance history. In some instances, such data may be stored in historical data and analysis database 133*f*. As such, accident assessment server 130 may be configured to request the necessary data to identify the baseline value range for the vehicle 110 from one or more of historical data and analysis database 133*f* and the one or more third party databases 140.

In other instances, the accident assessment server 130 may be configured to control, command, and/or instruct one or more of the third party databases 140 to transmit further information associated with vehicle 110 based on information needed to identify a baseline value range for the vehicle 110 as described below. For example, accident assessment server 130 may be configured to compare the vehicle operational data received at step 202 with data entries stored in historical data and analysis database 133*f* used to identify baseline value ranges for other vehicles. Based on the comparison, accident assessment server 130 may identify one or more data values needed to identify a baseline value range for vehicle 110. The accident assessment server 130 may be configured to control, command, and/or instruct one or more of the third party databases 140 to transmit the identified data needed to identify the baseline value range for vehicle 110.

At step 213, the one or more of the third party databases 140 may transmit the further information corresponding to the vehicle 110 to accident assessment server 130. At step 214, the accident assessment server 130 may receive the further information by way of communication interface(s) 132. At step 215, the loss determination module 133*c* may identify a baseline value range for the vehicle based on the vehicle operational data received at step 202 and the further information related to the vehicle received at step 214. In particular, loss determination module 133*c* may sort historical data and analysis database 133*f* based on the make, model, year, and further information (e.g., navigation system, sun roof, power windows, rim size, sound system, and the like) of the vehicle involved in the accident. In doing so, the loss determination module 133*c* may isolate data associated with previous accident assessments corresponding to the make, model, year, and further information associated with the vehicle involved in the accident to identify a baseline value range for the vehicle 110.

Figure 2D:
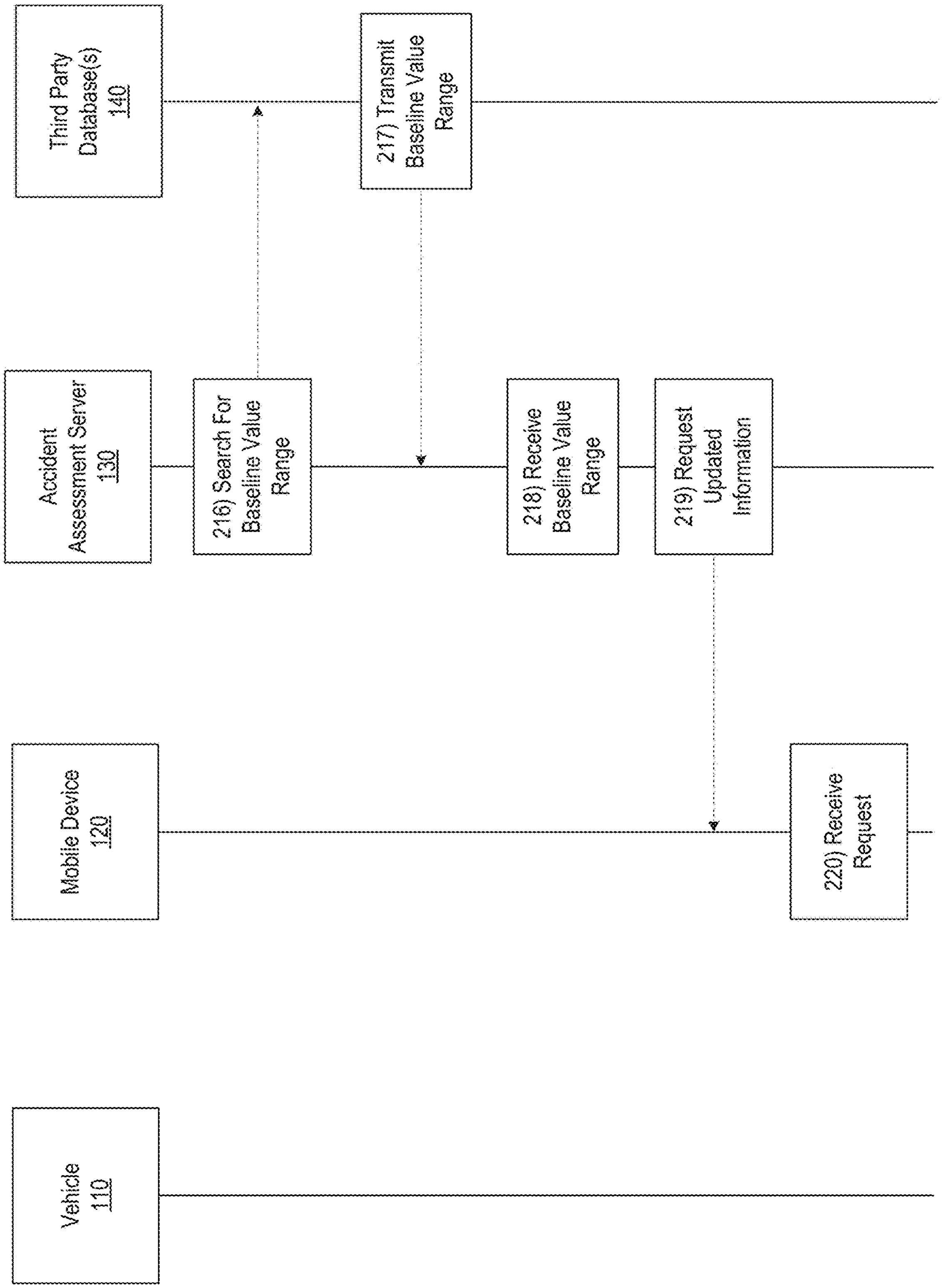

Referring to FIG. 2D, at step 216, additionally and/or alternatively, the loss determination module 133*c* of accident assessment server 130 may search one or more of the third party databases 140 to identify a baseline value range for the vehicle 110. In some instances, the searching of the one or more of the third party databases 140 may be performed if loss determination module 133*c* is unable to identify a baseline value range of the vehicle 110 from historical data and analysis database 133*f*. At step 217, the one or more of the third party databases 140 may transmit data corresponding to the baseline value range of the vehicle 110 to accident assessment server 130.

Figure 2E:
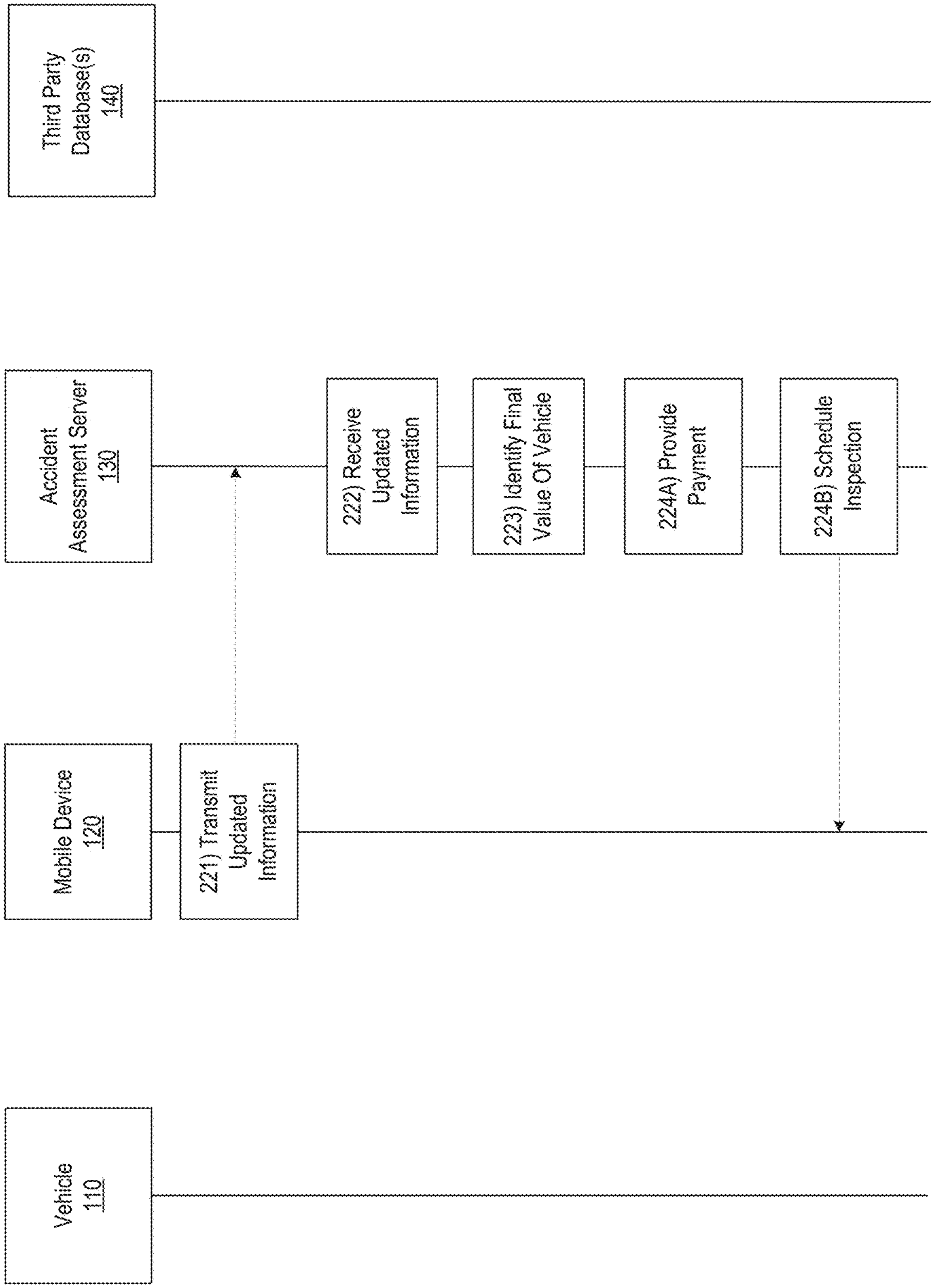

At step 218, the accident assessment server 130 may receive the baseline value range of the vehicle 110 from the one or more third party databases 140 by way of communication interface(s) 132. At step 219, the accident assessment server 130 may request updated vehicle specification information from a mobile device 120 associated with an owner of vehicle 110. In some instances, the request for updated vehicle specification information may include a prepopulated data sheet indicated believed-to-be information associated with the vehicle 110 such as make, model, year, mileage, and vehicle specification information (e.g., navigation system, sun roof, power windows, rim size, sound system, and the like). Furthermore, the request for updated vehicle specification information may include the baseline value range identified at step 213 and/or received at step 216. In any event, at step 220, the mobile device 120 may receive the request for updated vehicle specification information and at step 221, as shown in FIG. 2E, may transmit the updated information to accident assessment server 130. The updated information may include one or more of exact mileage, presence of aftermarket parts, and vehicle specification information associated with the vehicle. In some instances, the updated information may include revisions to the prepopulated data sheet, but in other instances the updated information may merely comprise an indication that the prepopulated data sheet included accurate information regarding vehicle 110. In any case, at step 222, the accident assessment server 130 may receive the updated information via communication interface(s) 132.

At step 223, the accident assessment server 130 may identify a final value of the vehicle 110 before the accident based on the updated vehicle specification information received at step 222. In some instances, the loss determination module 133*c* may identify the final value of the vehicle 110 before the accident based on the updated vehicle specification information received at step 222. In particular, loss determination module 133*c* may sort historical data and analysis database 133*f* based on the make, model, year, and updated information (e.g., navigation system, sun roof, power windows, rim size, sound system, and the like) of the vehicle involved in the accident. In doing so, the loss determination module 133*c* may isolate data associated with previous accident assessments corresponding to the make, model, year, and further information associated with the vehicle involved in the accident to identify a final value for the vehicle 110.

Responsive to determining that the final value of the vehicle 110 before the accident is within the baseline value range of the vehicle identified at step 215, the payment module 133*d* of the accident assessment server 130 may provide payment to the owner of vehicle 110 at step 224A corresponding to the final value of the vehicle. Conversely, responsive to determining that the final value of the vehicle 110 is not within the baseline value range of the vehicle identified at step 215, the payment module 133*d* may schedule a vehicle inspection appointment with the owner of vehicle 110 by transmitting a scheduling request to the mobile device 120 of the owner at step 224B.

Figure 2F:
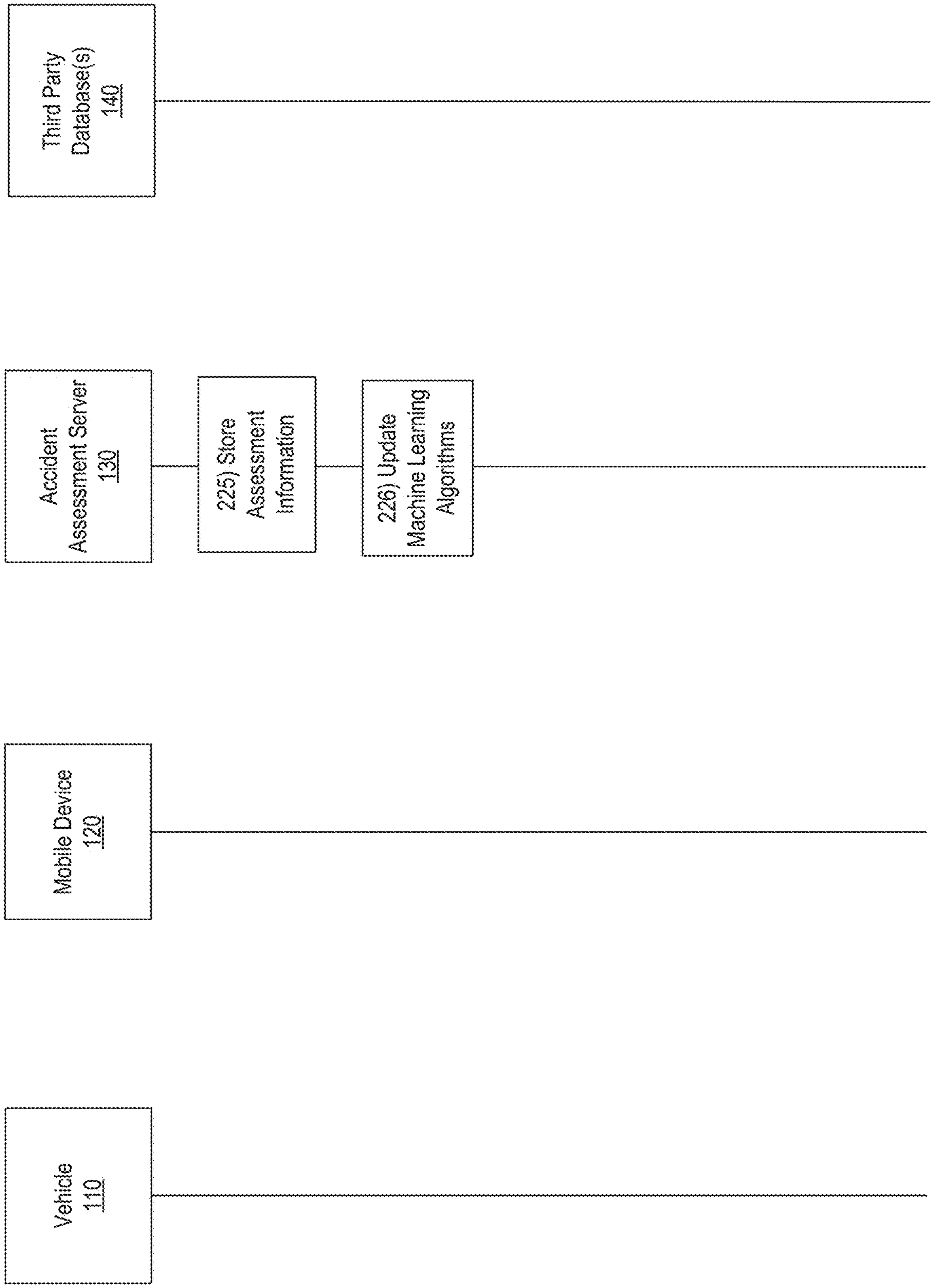

Referring to FIG. 2F, at step 225, the accident assessment server 130 may store the information (e.g., accident information, vehicle operational data at the time of the accident, vehicle specification information, identified baseline value range of the vehicle, final value of the vehicle, and the like) related to the vehicle 110 in historical data and analysis database 133*f*. Furthermore, at step 226, the accident assessment server 130 may update the machine learning algorithms used to identify whether the accident resulted in a total loss. For instance, the accident assessment server 130 may revise the machine learning algorithms if the final value of the vehicle was identified as being greater than the baseline value range of the vehicle, within the baseline value range of the vehicle, or less than the baseline value range of the vehicle.

Figure 3:
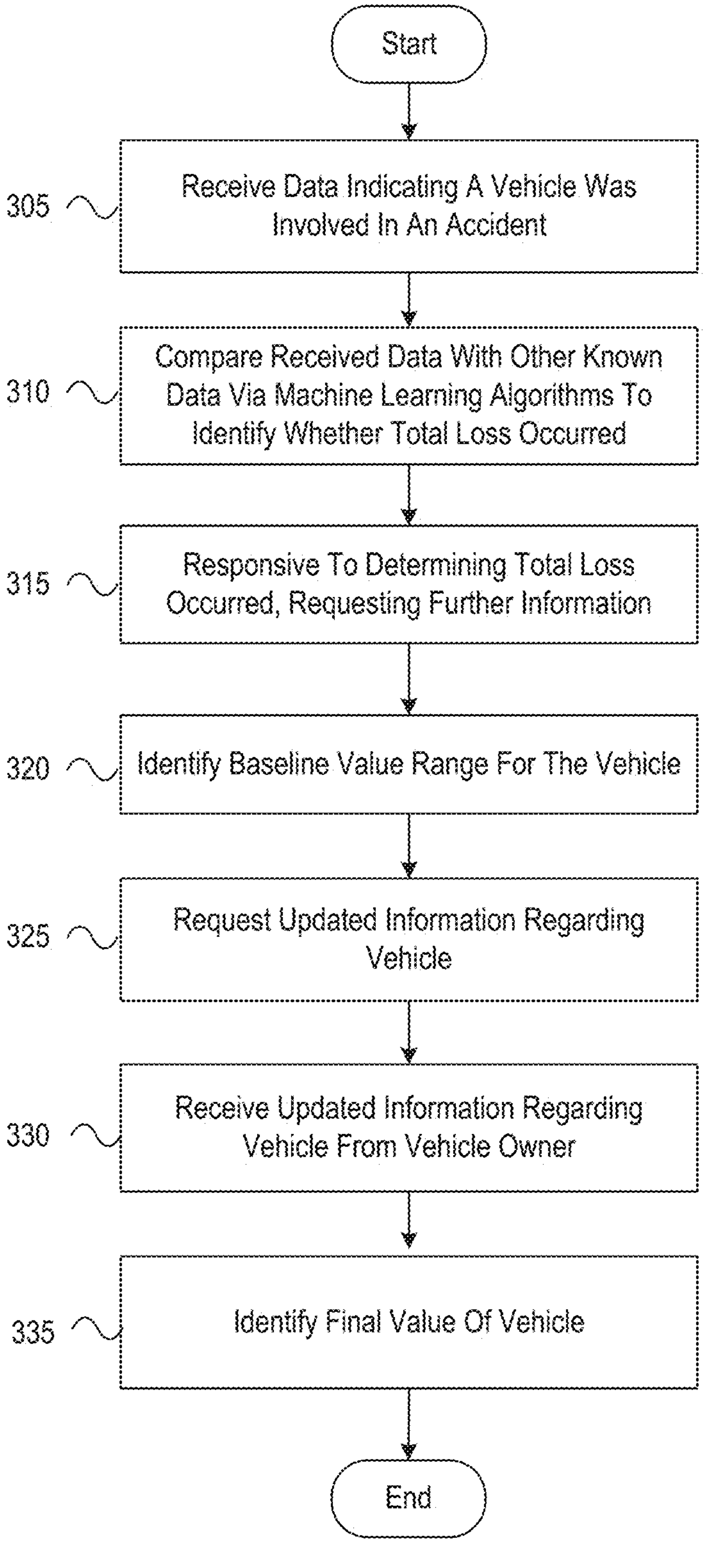
FIG. 3 depicts an illustrative method for machine learning based accident assessment in accordance with one or more aspects of the disclosure.

FIG. 3 illustrates one example method for machine learning based accident assessment in accordance with one or more example embodiments. Referring to FIG. 3, at step 305, a computing device having at least one processor, communication interface and memory, may receive, via the communication interface, from a telematics device associated with a vehicle, data indicating that the vehicle was involved in an accident. At step 310, the computing device may compare, via machine learning algorithms, the received data with other known data to identify whether the accident resulted in a total loss. At step 315, responsive to determining that the accident resulted in the total loss, the computing device may request, by the communication interface, further information regarding the vehicle from the telematics device. At step 320, the computing device may identify, based on the received data and further data, a baseline value range for the vehicle. At step 325, the computing device may request, by the communication interface, from a mobile device associated with an owner of the vehicle, updated information regarding the vehicle. At step 330, the computing device may receive, by the communication interface, updated information from the mobile device of the owner of the vehicle. At step 335, the computing device may identify, based on the updated information, a final value of the vehicle.

FIG. 4 illustrates a block diagram of an accident assessment computing device 401 in a system that may be used according to one or more illustrative embodiments of the disclosure. The accident assessment computing device 401 may have a processor 403 for controlling overall operation of an accident assessment computing device 401 and its associated components, including RAM 405, ROM 407, input/output module 409, and memory unit 415. The accident assessment computing device 401, along with one or more additional devices (e.g., terminals 441, 451) may correspond to any of multiple systems or devices, such as accident assessment systems, configured as described herein for performing methods corresponding to the usage of machine learning algorithms to identify whether an accident resulted in a total loss.

Input/Output (I/O) module 409 may include a microphone, keypad, touch screen, and/or stylus through which a user of the accident assessment computing device 401 may provide input, and may also include one or more of a speaker for providing audio input/output and a video display device for providing textual, audiovisual and/or graphical output. Software may be stored within memory unit 415 and/or other storage to provide instructions to processor 403 for enabling accident assessment computing device 401 to perform various functions. For example, memory unit 415 may store software used by the accident assessment computing device 401, such as an operating system 417, application programs 419, and an associated internal database 421. The memory unit 415 includes one or more of volatile and/or non-volatile computer memory to store computer-executable instructions, data, and/or other information. Processor 403 and its associated components may allow the accident assessment computing device 401 to execute a series of computer-readable instructions to perform the one or more of the processes or functions described herein.

The accident assessment computing device 401 may operate in a networked environment 400 supporting connections to one or more remote computers, such as terminals/devices 441 and 451. Accident assessment computing device 401, and related terminals/devices 441 and 451, may include devices installed in vehicles and/or homes, mobile devices that may travel within vehicles and/or may be situated in homes, or devices outside of vehicles and/or homes that are configured to perform aspects of the processes described herein. Thus, the accident assessment computing device 401 and terminals/devices 441 and 451 may each include personal computers (e.g., laptop, desktop, or tablet computers), servers (e.g., web servers, database servers), vehicle-based devices (e.g., on-board vehicle computers, short-range vehicle communication systems, sensors, and telematics devices), or mobile communication devices (e.g., mobile phones, portable computing devices, and the like), and may include some or all of the elements described above with respect to the dispatch control computing device 401. The network connections depicted in FIG. 4 include a local area network (LAN) 425 and a wide area network (WAN) 429, and a wireless telecommunications network 433, but may also include other networks. When used in a LAN networking environment, the accident assessment computing device 401 may be connected to the LAN 425 through a network interface or adapter 423. When used in a WAN networking environment, the accident assessment computing device 401 may include a modem 427 or other means for establishing communications over the WAN 429, such as network 431 (e.g., the Internet). When used in a wireless telecommunications network 433, the accident assessment computing device 401 may include one or more transceivers, digital signal processors, and additional circuitry and software for communicating with wireless computing devices 441 (e.g., mobile phones, short-range vehicle communication systems, vehicle sensing and telematics devices) via one or more network devices 435 (e.g., base transceiver stations) in the wireless network 433.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and components described herein may be configured to communicate using any of these network protocols or technologies.

Additionally, one or more application programs 419 used by the computing device 401 may include computer executable instructions for receiving data and performing other related functions as described herein.

Such an arrangement and processes as described above may provide distinct technological advantages. In particular, through the utilization of machine learning algorithms to identify whether an accident occurred, processing efficiency may be increased and processing energy expenditure may be decreased. Moreover, by leveraging vehicle computing infrastructure (e.g., sensors, telematics device, on-board computer, and the like) to gather vehicle information and operational data, increased accuracy and reliability of identified information (e.g., whether accident occurred, whether total loss occurred, baseline value of vehicle, final value of vehicle, and the like) may be achieved.

As will be appreciated by one of skill in the art, the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An accident assessment system, comprising:

at least one processor;

a communication interface communicatively coupled to the at least one processor; and memory-storing computer-readable instructions that, when executed by the at least one processor, cause the accident assessment system to:

receive vehicle operational data from a vehicle sensor associated with a vehicle, wherein the vehicle operational data indicates an acceleration of the vehicle;

performing signal processing on the received vehicle operational data including at least one of: smoothing, filtering, transforming, companding, limiting, and noise gating to isolate a vehicle crash indicator from an electronic signal transmitted by the vehicle sensor;

after determining, from the vehicle operational data, that the vehicle decelerated at a rate that is above a predetermined threshold that is indicative of a vehicle crash, communicate, to a telematics device associated with the vehicle, a request for vehicle information indicating at least one of a make, model, or year of the vehicle;

after receiving the vehicle information, isolate historical accident data from a historical data and analysis database based upon the request for vehicle information;

compare, using a machine learning engine, the isolated historical accident data with the vehicle operational data;

after predicting, by the machine learning engine, that an accident with the vehicle occurred and that the accident resulted in a total loss for the vehicle and after determining that a deviation between a final value of the vehicle and a baseline monetary value range for the vehicle exceeds a predetermined accuracy threshold, update one or more algorithms of the machine learning engine based on a relatedness of the baseline monetary value range for the vehicle to the final value of the vehicle to facilitate an improvement to a total loss prediction accuracy of the machine learning engine and a reduction in processing energy expenditure by the accident assessment system in one or more subsequent total loss accident determinations, wherein updating the one or more algorithms comprises iteratively redefining parameters stored in the historical data and analysis database.

2. The accident assessment system of claim 1, wherein the instructions, when executed by the at least one processor, further cause the accident assessment system to:

request updated information associated with the vehicle;

determine, by a loss determination model, based on receiving the updated information regarding the vehicle from a device associated with an owner of the vehicle, a final monetary value of the vehicle; and determine, based on whether the final monetary value of the vehicle is within in the baseline monetary value range for the vehicle, whether to provide payment to the owner of the vehicle.

3. The accident assessment system of claim 2, wherein the instructions, when executed by the at least one processor, further cause the accident assessment system to:

responsive to determining that the final monetary value of the vehicle is within the baseline monetary value range of the vehicle, provide the payment to the owner, wherein the payment corresponds to the final monetary value of the vehicle.

4. The accident assessment system of claim 1, wherein:

the vehicle operational data received from the vehicle sensor comprises one or more of: an indication of airbag deployment, an indication of vehicle impact, one or more acceleration values, and one or more braking force values, and the vehicle information comprises one or more of: mileage, presence of aftermarket parts, and vehicle specification information associated with the vehicle.

5. The accident assessment system of claim 1, wherein the instructions, when executed by the at least one processor, further cause the accident assessment system to:

receive, from one or more databases storing information associated with the vehicle, the vehicle information, wherein the one or more databases comprise at least one of: a vehicle identification number (VIN) database, a used car listing database, a vehicle history database, a vehicle maintenance history database, a state department of motor vehicle database, and an insurance claims database.

6. The accident assessment system of claim 2, wherein the instructions, when executed by the at least one processor, further cause the accident assessment system to:

schedule, responsive to determining that the final monetary value of the vehicle is outside of the baseline monetary value range of the vehicle, a vehicle inspection appointment with the owner of the vehicle.

7. The accident assessment system of claim 6, wherein the instructions, when executed by the at least one processor, further cause the accident assessment system to:

transmit, to the device of the owner of the vehicle, a scheduling request for the vehicle inspection appointment.

8. A method, comprising:

receiving vehicle operational data from a vehicle sensor associated with a vehicle, wherein the vehicle operational data indicates an acceleration of the vehicle;

performing signal processing on the received vehicle operational data including at least one of: smoothing, filtering, transforming, companding, limiting, and noise gating to isolate a vehicle crash indicator from an electronic signal transmitted by the vehicle sensor;

after determining, from the vehicle operational data, that the vehicle decelerated at a rate that is above a predetermined threshold that is indicative of a vehicle crash, communicating, to a telematics device associated with the vehicle, a request for vehicle information indicating at least one of a make, model, or year of the vehicle;

after receiving the vehicle information, isolating historical accident data from a historical data and analysis database based upon the request for vehicle information;

comparing, using a machine learning engine, the isolated historical accident data with the vehicle operational data;

after predicting, by the machine learning engine, that an accident with the vehicle occurred and that the accident resulted in a total loss for the vehicle, and after determining that a deviation between a final value of the vehicle and a baseline monetary value range for the vehicle exceeds a predetermined accuracy threshold, updating one or more algorithms of the machine learning engine based on a relatedness of the baseline monetary value range for the vehicle to the final value of the vehicle to facilitate an improvement to a total loss prediction accuracy of the machine learning engine and a reduction in processing energy expenditure by the accident assessment system in one or more subsequent total loss accident determinations, wherein updating the one or more algorithms comprises iteratively redefining parameters stored in the historical data and analysis database.

9. The method of claim 8, further comprising, responsive to determining that the accident resulted in the total loss:

requesting updated information associated with the vehicle;

determining, by a loss determination model, based on receiving the updated information regarding the vehicle from a device associated with an owner of the vehicle, a final monetary value of the vehicle; and determining, based on whether the final monetary value of the vehicle is within the baseline monetary value range for the vehicle, whether to provide payment to the owner of the vehicle.

10. The method of claim 9, further comprising:

providing, responsive to determining that the final monetary value of the vehicle is within the baseline monetary value range of the vehicle, the payment to the owner, wherein the payment corresponds to the final monetary value of the vehicle.

11. The method of claim 9, wherein the updated information comprises one or more of: mileage, presence of aftermarket parts, and vehicle specification information associated with the vehicle.

12. The method of claim 8, wherein the vehicle operational data received from the vehicle sensor comprises one or more of: an indication of airbag deployment, an indication of vehicle impact, one or more acceleration values, and one or more braking force values.

13. The method of claim 8, the method further comprising:

receiving, from one or more databases storing information associated with the vehicle, the vehicle information, wherein the one or more databases comprise at least one of: a vehicle identification number (VIN) database, a used car listing database, a vehicle history database, a vehicle maintenance history database, a state department of motor vehicle database, and an insurance claims database.

14. The method of claim 9, further comprising:

scheduling, responsive to determining that the final monetary value of the vehicle is outside of the baseline monetary value range of the vehicle, a vehicle inspection appointment with the owner of the vehicle.

15. The method of claim 14, further comprising:

transmitting, to the device of the owner of the vehicle, a scheduling request for the vehicle inspection appointment.

16. One or more non-transitory, computer-readable media storing instructions that, when executed by at least one processor, cause a computing device to:

receive vehicle operational data from a vehicle sensor associated with a vehicle, wherein the vehicle operational data indicates an acceleration of the vehicle;

performing signal processing on the received vehicle operational data including at least one of: smoothing, filtering, transforming, companding, limiting, and noise gating to isolate a vehicle crash indicator from an electronic signal transmitted by the vehicle sensor;

after determining, from the vehicle operational data, that the vehicle decelerated at a rate that is above a predetermined threshold that is indicative of a vehicle crash, communicate, to a telematics device associated with the vehicle, a request for vehicle information indicating at least one of a make, model, or year of the vehicle;

after receiving the vehicle information, isolate historical accident data from a historical data and analysis database based upon the request for vehicle information;

compare, using a machine learning engine comparing the isolated historical accident data with the vehicle operational data; and after determining, by the machine learning engine, that an accident with the vehicle occurred and that the accident resulted in a total loss for the vehicle, and after determining that a deviation between a final value of the vehicle and a baseline monetary value range for the vehicle exceeds a predetermined accuracy threshold, update one or more algorithms of the machine learning engine based on a relatedness of the baseline monetary value range for the vehicle to the final value of the vehicle to facilitate an improvement to a total loss prediction accuracy of the machine learning engine and a reduction in processing energy expenditure by the accident assessment system in one or more subsequent total loss accident determinations, wherein updating the one or more algorithms comprises iteratively redefining parameters stored in the historical data and analysis database.

17. The one or more non-transitory, computer-readable media of claim 16, wherein the instructions, when executed by the at least one processor, cause the computing device to:

request updated information associated with the vehicle;

determine, by a loss determination model, based on receiving the updated information regarding the vehicle from a device associated with an owner of the vehicle, a final monetary value of the vehicle; and determine, based on whether the final monetary value of the vehicle is within in the baseline monetary value range for the vehicle, whether to provide payment to the owner of the vehicle.

18. The one or more non-transitory, computer-readable media of claim 17, wherein the instructions, when executed by the at least one processor, cause the computing device to:

responsive to determining that the final monetary value of the vehicle is within the baseline monetary value range of the vehicle, provide the payment to the owner of the vehicle, wherein the payment corresponds to the final monetary value of the vehicle.

19. The one or more non-transitory, computer-readable media of claim 17, wherein the instructions, when executed by the at least one processor, cause the computing device to:

schedule, responsive to determining that the final monetary value of the vehicle is outside of the baseline monetary value range of the vehicle, a vehicle inspection appointment with the owner of the vehicle.

20. The one or more non-transitory, computer-readable media of claim 19, wherein the instructions, when executed by the at least one processor, cause the computing device to:

transmit, to the device of the owner of the vehicle, a scheduling request for the vehicle inspection appointment.

* * * * *